(12) United States Patent
Xu

(10) Patent No.: US 12,173,138 B2
(45) Date of Patent: *Dec. 24, 2024

(54) COMPOSITIONS AND METHODS FOR IMPROVING POLYMER FLOW RATE

(71) Applicant: Inovia Materials LLC, Greenwood Village, CO (US)

(72) Inventor: Jeff Xu, Greenwood Village, CO (US)

(73) Assignee: Inovia Materials (Hangzhou) Co. Ltd, Zhejiang (CN)

( * ) Notice: Subject to any disclaimer, the term of this patent is extended or adjusted under 35 U.S.C. 154(b) by 157 days.

This patent is subject to a terminal disclaimer.

(21) Appl. No.: 17/650,448

(22) Filed: Feb. 9, 2022

(65) Prior Publication Data

US 2022/0282066 A1     Sep. 8, 2022

Related U.S. Application Data

(63) Continuation-in-part of application No. 16/791,601, filed on Feb. 14, 2020, now Pat. No. 11,279,815.

(51) Int. Cl.
| | | |
|---|---|---|
| C08K 5/50 | (2006.01) | |
| C08J 3/20 | (2006.01) | |
| C08K 3/34 | (2006.01) | |
| C08K 5/3445 | (2006.01) | |
| C08K 5/521 | (2006.01) | |
| C08K 7/06 | (2006.01) | |
| C08K 7/14 | (2006.01) | |

(52) U.S. Cl.
CPC ............... *C08K 5/50* (2013.01); *C08J 3/203* (2013.01); *C08K 3/346* (2013.01); *C08K 5/3445* (2013.01); *C08K 5/521* (2013.01); *C08K 7/06* (2013.01); *C08K 7/14* (2013.01); *C08J 2323/06* (2013.01); *C08J 2323/08* (2013.01); *C08J 2323/12* (2013.01); *C08J 2325/06* (2013.01); *C08J 2331/04* (2013.01); *C08J 2355/02* (2013.01); *C08J 2367/02* (2013.01); *C08J 2369/00* (2013.01); *C08J 2375/04* (2013.01); *C08J 2377/06* (2013.01); *C08J 2379/08* (2013.01); *C08J 2381/02* (2013.01)

(58) Field of Classification Search
CPC .......... C08K 5/50; C08K 5/3445; C08K 7/06; C08K 7/14; C08K 3/346; C08K 5/521; C08J 3/203

See application file for complete search history.

(56) References Cited

U.S. PATENT DOCUMENTS

| | | | |
|---|---|---|---|
| 4,108,922 A * | 8/1978 | Crescentini | C08L 77/00 528/111 |
| 4,279,799 A | 7/1981 | MacGregor et al. | |
| 5,459,226 A | 10/1995 | King, Jr. | |
| 6,417,255 B1 | 7/2002 | Penning et al. | |
| 6,599,966 B2 | 7/2003 | Penning et al. | |
| 11,279,815 B2 * | 3/2022 | Xu | C07F 9/5442 |
| 2001/0016626 A1 | 8/2001 | Vollenberg et al. | |
| 2002/0132889 A1 | 9/2002 | Penning | |
| 2003/0211320 A1 | 11/2003 | Thompson et al. | |
| 2004/0121679 A1 * | 6/2004 | Ortega | D04H 3/00 442/401 |
| 2006/0100326 A1 | 5/2006 | Kawakabe et al. | |
| 2010/0222476 A1 | 9/2010 | Avakian et al. | |
| 2011/0073331 A1 | 3/2011 | Xu | |
| 2015/0291776 A1 | 10/2015 | Kim | |

FOREIGN PATENT DOCUMENTS

| | | |
|---|---|---|
| EP | 3 865 540 A | 8/2021 |
| JP | 07166039 A2 | 6/1995 |
| JP | H07166039 | 1/2001 |
| JP | 2003517078 B2 | 5/2003 |
| JP | 2004002730 A2 | 1/2004 |
| JP | 2004-002730 | 4/2007 |
| JP | 2014015610 | 1/2014 |
| WO | 02/48263 A2 | 6/2002 |
| WO | 2007/143525 | 12/2007 |
| WO | 2007143525 A1 | 12/2007 |
| WO | 2015/157051 | 10/2015 |

OTHER PUBLICATIONS

European Search Report for Application No. 20167296.1 mailed Jul. 30, 2020.
European Search Report of EP 23 15 1932 mailed on Jul. 21, 2023.
Zheng, Y. et al., "Improving mechanical properties of recycled polypropylene-based composites using Taguchi and ANOVA techniques," Procedia CIRP 61, 2017, 287-292.
Ghosh, A. et al., "Nitrile rubber/peroxide treatment transformed recycled polyethylene into mechanically improved materials," SPE Polymers, 2023, 130-139.
Badia, J.D. et al., "The role of crystalline, mobile amorphous and rigid amorphous fractions in the performance of recycled poly(ethylene terephthalate) (PET)," Polymer Degradation and Stability, 2012, 98-107.
Senkerik, V. et al., "Effect of Particle Size of Recycled Polyamide 6 to Impact Toughness and Hardness," Applied Mechanics and Materials, 2015, 300-303.

* cited by examiner

*Primary Examiner* — John E Uselding
(74) *Attorney, Agent, or Firm* — Thomas|Horstemeyer, LLP

(57) ABSTRACT

The present disclosure provides a polymeric composition including a thermoplastic polymer and an ionic liquid compound, wherein the ionic liquid compound improves the melt flow rate of the polymeric composition. The present disclosure also provides a method of preparing a polymeric composition with improved melt flow rate by mixing an ionic liquid compound with a thermoplastic polymer to obtain the polymeric composition. In some aspects, the polymeric composition includes a recycled polymer.

12 Claims, No Drawings

COMPOSITIONS AND METHODS FOR IMPROVING POLYMER FLOW RATE

CROSS REFERENCE TO RELATED APPLICATIONS

This application is a continuation-in-part of U.S. Non-Provisional application Ser. No. 16/791,601 filed on Feb. 14, 2020, which is incorporated herein by reference in its entirety.

FIELD OF INVENTION

The disclosure relates to compositions and methods for improving polymer melt flow rate.

BACKGROUND

Flow improvers are important additives in polymer industry. They enable polymers to be processed and recycled at a lower temperature and in a more efficient manner. Flow improvers can also help achieve a smoother surface, and lower the defect rate of the polymer product. A good melt flow behavior allows fast molding cycles and complex mold making.

SUMMARY

In one aspect, the present disclosure provides a method of preparing a polymeric composition with improved melt flow rate including the steps of: mixing between about 70 wt % and about 99.99 wt % of a thermoplastic polymer with between about 0.01 wt % and about 30 wt % of a compound having the formula (I)

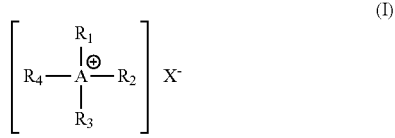

(I)

wherein A is P or N,
when A is P,
each of $R_1$, $R_2$, $R_3$ and $R_4$ is independently selected from the group consisting of ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl($C_1$-$C_8$) alkyl, aryl($C_1$-$C_8$)alkyl, heteroaryl and heteroaryl($C_1$-$C_8$)alkyl that may be unsubstituted or substituted by halogen, nitro, trifluoromethyl, trifluoromethoxy, methoxy, carboxy, —$NH_2$, —OH, —SH, —$NHCH_3$, —$N(CH_3)_2$, cyano, —SMe, and —$SO_3H$,
$X^-$ is selected from the group consisting of halide, $[B(R)_4]^-$, $OH^-$, $SCN^-$, $RPO_4^-$, $(RO)_2P(=O)O^-$, $RSO_4^-$, $ROSO_3^-$, $[N(CN)_2]^-$, $[RCOO]^-$, $[NO_3]^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl ($C_1$-$C_8$)alkyl, aryl($C_1$-$C_8$)alkyl, heteroaryl and heteroaryl($C_1$-$C_8$)alkyl group that may be unsubstituted or substituted by halogen, nitro, methoxy, carboxy, —$NH_2$, —OH, —SH, —$NHCH_3$, —$N(CH_3)_2$, —SMe and cyano;

when A is N,
each of $R_1$, $R_2$, $R_3$ and $R_4$ is independently selected from the group consisting of hydrogen, ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl($C_1$-$C_8$)alkyl, aryl($C_1$-$C_8$)alkyl, heteroaryl and heteroaryl($C_1$-$C_8$)alkyl group that may be unsubstituted or substituted by halogen, nitro, trifluoromethyl, trifluoromethoxy, methoxy, carboxy, —$NH_2$, —OH, —SH, —$NHCH_3$, —$N(CH_3)_2$, cyano, —SMe, and —$SO_3H$, or

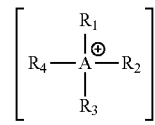

is a heterocyclyl or a heteroaryl ring containing nitrogen, wherein the heterocyclyl or the heteroaryl ring is optionally substituted by a substitution selected the group consisting of ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl($C_1$-$C_8$)alkyl, aryl($C_1$-$C_8$)alkyl, heteroaryl and heteroaryl($C_1$-$C_8$)alkyl group that may be unsubstituted or substituted by halogen, nitro, trifluoromethyl, trifluoromethoxy, methoxy, carboxy, —$NH_2$, —OH, —SH, —$NHCH_3$, —$N(CH_3)_2$, cyano, —SMe, and —$SO_3H$,
$X^-$ is selected from the group consisting of halide, $[B(R)_4]^-$, $OH^-$, $SCN^-$, $RPO_4^-$, $(RO)_2P(=O)O^-$, $RSO_3^-$, $RSO_4^-$, $ROSO_3^-$, $[N(CN)_2]^-$, $RCOO^-$, $NO_3^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl ($C_1$-$C_8$)alkyl, aryl($C_1$-$C_8$)alkyl, heteroaryl and heteroaryl($C_1$-$C_8$)alkyl group that may be unsubstituted or substituted by halogen, nitro, methoxy, carboxy, —$NH_2$, —OH, —SH, —$NHCH_3$, —$N(CH_3)_2$, —SMe and cyano;
wherein the polymeric composition has a melt flow rate higher than that of the thermoplastic polymer.

In another aspect, the present disclosure provides polymeric composition including between about 70 wt % and about 99.99 wt % of a thermoplastic polymer, optionally between about 91 wt % and about 99 wt %, or about 70, 75, 80, 85, 90, 91, 92, 93, 94, 95, 96, 97, 98, 99, 99.95, or about 99.99 wt %, or a combination of any of the foregoing values, or a range encompassing any of the foregoing values; and between about 0.01 wt % and about 30 wt %, optionally between about 1 wt % and about 9 wt %, or about 0.01, 0.05, 1, 2, 3, 4, 5, 6, 7, 8, 9, 10, 15, 20, 25, or about 30 wt %, or a combination of any of the foregoing values, or a range encompassing any of the foregoing values, of a compound having the formula of

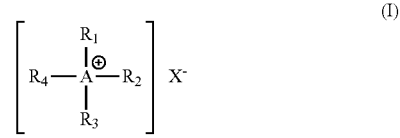

(I)

wherein A is P or N;
when A is P,
each of $R_1$, $R_2$, $R_3$ and $R_4$ is independently selected from the group consisting of ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl ($C_1$-$C_8$) alkyl, aryl($C_1$-$C_8$)alkyl, heteroaryl and heteroaryl($C_1$-$C_8$)alkyl that may be unsubstituted or substituted by halogen, nitro, trifluoromethyl, trifluoromethoxy, methoxy, carboxy, —$NH_2$, —OH, —SH, —$NHCH_3$, —$N(CH_3)_2$, cyano, —SMe, and —$SO_3H$, $X^-$ is selected from the group consisting of halide, $[B(R)_4]^-$, $OH^-$, $SCN^-$, $RPO_4^-$, $(RO)_2P(=O)O^-$, $RSO_4^-$, $ROSO_3^-$, $[N(CN)_2]^-$, $[RCOO]^-$, $[NO_3]^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl($C_1$-$C_8$)alkyl, aryl($C_1$-$C_8$)alkyl, heteroaryl and heteroaryl($C_1$-$C_8$)alkyl that may be unsubstituted or substituted by halogen, nitro, methoxy, carboxy, —$NH_2$, —OH, —SH, —$NHCH_3$, —$N(CH_3)_2$, —SMe and cyano;

when A is N, each of $R_1$, $R_2$, $R_3$ and $R_4$ is independently selected from the group consisting of hydrogen, ($C_1$-$C_{20}$)alkyl, aryl, ($C_3$-$C_{10}$)heterocyclyl, ($C_3$-$C_{10}$)cycloalkyl, ($C_3$-$C_{10}$) heterocyclyl($C_1$-$C_8$)alkyl, aryl($C_1$-$C_8$)alkyl, heteroaryl and heteroaryl($C_1$-$C_8$)alkyl group that may be unsubstituted or substituted by halogen, nitro, trifluoromethyl, trifluoromethoxy, methoxy, carboxy, —$NH_2$, —OH, —SH, —$NHCH_3$, —$N(CH_3)_2$, cyano, —SMe, and —$SO_3H$, or

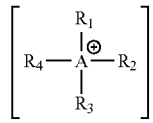

is a heterocyclyl or a heteroaryl containing nitrogen, wherein the heterocyclyl or the heteroaryl ring is optionally substituted by a substitution selected the group consisting of ($C_1$-$C_{20}$)alkyl, aryl, ($C_3$-$C_{10}$)heterocyclyl, ($C_3$-$C_{10}$)cycloalkyl, ($C_3$-$C_{10}$) heterocyclyl($C_1$-$C_8$)alkyl, aryl($C_1$-$C_8$)alkyl, heteroaryl and heteroaryl($C_1$-$C_8$)alkyl group that may be unsubstituted or substituted by halogen, nitro, trifluoromethyl, trifluoromethoxy, methoxy, carboxy, —$NH_2$, —OH, —SH, —$NHCH_3$, —$N(CH_3)_2$, cyano, —SMe, and —$SO_3H$, $X^-$ is selected from the group consisting of halide, $[B(R)_4]^-$, $OH^-$, $SCN^-$, $RPO_4^-$, $(RO)_2P(=O)O^-$, $RSO_3^-$, $RSO_4^-$, $ROSO_3^-$, $[N(CN)_2]^-$, $RCOO^-$, $NO_3^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of ($C_1$-$C_{20}$)alkyl, aryl, ($C_3$-$C_{10}$)heterocyclyl, ($C_3$-$C_{10}$)cycloalkyl, ($C_3$-$C_{10}$)heterocyclyl ($C_1$-$C_8$)alkyl, aryl($C_1$-$C_8$)alkyl, heteroaryl and heteroaryl($C_1$-$C_8$)alkyl group that may be unsubstituted or substituted by halogen, nitro, methoxy, carboxy, —$NH_2$, —OH, —SH, —$NHCH_3$, —$N(CH_3)_2$, —SMe and cyano;

wherein the thermoplastic polymer is a high temperature polymer selected from the group consisting of polyamides, polyamideimides, polysulfones, polyethersulfones, polyarylsulfones, poly ketones, polyphenylsulfones, polyetherimides, polyetherketones, polyphenylene sulfoxide, and combinations thereof; or the thermoplastic polymer is a thermoplastic elastomer selected from the group consisting of thermoplastic polyurethanes, thermoplastic copolyester, thermoplastic polyamides, and combinations thereof;

wherein the polymeric composition has a melt flow rate higher than that of the thermoplastic polymer. In some embodiments, the polymeric composition includes a recycled polymer. In other embodiments, the compound having formula (I) is added to the composition during the polymerization of the thermoplastic polymer.

DETAILED DESCRIPTION

Provided are compositions and methods for improving polymer melt flow rate. The present disclosure provides a polymeric composition including a thermoplastic polymer and an ionic liquid compound, wherein the ionic liquid compound improves the melt flow rate of the polymeric composition. The present disclosure also provides a method of preparing a polymeric composition with improved melt flow rate by mixing an ionic liquid compound with a thermoplastic polymer to obtain the polymeric composition.

For convenience, before further description of the present invention, certain terms used in the specification, examples and appended claims are collected here. These definitions should be read in light of the remainder of the disclosure and understood as by a person of skill in the art. Unless defined otherwise, all technical and scientific terms used herein have the same meaning as commonly understood by a person of ordinary skill in the art. The terms used throughout this specification are defined as follows, unless otherwise limited in specific instances.

The articles "a," "an" and "the" are used to refer to one or to more than one (i.e., to at least one) of the grammatical object of the article.

The term "about" herein is used to indicate that a value includes the inherent variation of error for the device, the method being employed to determine the value, or the variation that exists among the study subjects.

The terms "optional" and "optionally" as used herein mean that the subsequently described event or circumstance may or may not occur, and that the description includes instances where the event or circumstance occurs and instances in which it does not. For example, "optionally substituted aryl" encompasses both "aryl" and "substituted aryl" as defined herein.

The term "alkyl" as used herein refers to a linear or branched saturated hydrocarbon. Examples of alkyl groups include, but are not limited to, methyl, ethyl, propyl such as propan-1-yl, propan-2-yl (iso-propyl), butyls such as butan-1-yl, butan-2-yl (sec-butyl), 2-methyl-propan-1-yl (isobutyl), 2-methyl-propan-2-yl (tert-butyl), pentyls, hexyls, octyls, and decyls. In some embodiments, an alkyl group has from 1 to 10 carbon atoms, from 1 to 6 carbon atoms, or from 1 to 4 carbon atoms.

The term "aryl" as used herein refers to a monocyclic aromatic hydrocarbon group or a multicyclic group that contains at least one aromatic hydrocarbon ring. In certain embodiments, an aryl group has from 6 to 15 or more, or 6 to 12 or more, or 6 to 10 or more, ring atoms. Examples of aryl groups include, but are not limited to, phenyl, naphthyl, fluorenyl, azulenyl, anthryl, phenanthryl, biphenyl and terphenyl. The aromatic hydrocarbon ring of an aryl group may be attached or fused to one or more saturated, partially unsaturated, or aromatic rings—e.g., dihydronaphthyl, indenyl, indanyl and tetrahydronaphthyl (tetralinyl). An aryl group may optionally be substituted with one or more substituents as described herein.

The term "cycloalkyl" as used herein refers to a saturated or unsaturated monocyclic, bicyclic, other multicyclic, or bridged cyclic hydrocarbon group. A cycloalkyl group can have 3-22, 3-12, or 3-8 ring carbons, referred to herein as ($C_3$-$C_{22}$)cycloalkyl, ($C_3$-$C_{22}$)cycloalkyl, or ($C_3$-$C_8$)cycloalkyl, respectively. A cycloalkyl group can also have one or more carbon-carbon double bond or carbon-carbon triple bond.

The term "heterocyclyl", "heterocycle" or "heterocyclic" refers to cyclic groups containing at least one heteroatom as a ring atom. In some embodiments, the heterocyclyl, heterocycle or heterocyclic group includes 1 to 3 heteroatoms as ring atoms, with the remainder of the ring atoms being carbon atoms. Examples of heteroatoms include oxygen, sulfur, and nitrogen. In some embodiments, the heterocycle may be 3- to 10-membered ring structures or 3- to 7-membered rings, whose ring structures include one to four heteroatoms. The "heterocyclyl", "heterocycle" or "heterocyclic" may be a single saturated or partially unsaturated non-aromatic ring or a non-aromatic multiple ring system. Examples of heterocycles include, but are not limited to, azetidine, aziridine, imidazolidine, morpholine, oxirane (epoxide), oxetane, piperazine, piperidine, pyrazolidine, piperidine, pyrrolidine, pyrrolidinone, tetrahydrofuran, tetrahydrothiophene, dihydropyridine, tetrahydropyridine, tetrahydro-2H-thiopyran 1,1-dioxide, quinuclidine, N-bromopyrrolidine, and N-chloropiperidine.

The term "heteroaryl" as used herein refers to a mono-, bi-, or multi-cyclic aromatic ring system containing one or more heteroatoms, for example 1-3 heteroatoms, such as nitrogen, oxygen, and sulfur. Heteroaryls can also be fused to non-aromatic rings. In various embodiments, the term "heteroaryl" as used herein represents a stable 5- to 7-membered monocyclic, stable 9- to 10-membered fused bicyclic, or stable 12- to 14-membered fused tricyclic heterocyclic ring system which contains an aromatic ring that contains at least one heteroatom selected from the group consisting of N, O, and S. In some embodiments, at least one nitrogen is in the aromatic ring. Examples of heteroaryl groups include, but are not limited to, acridine, benzoimidazole, benzothiophene, benzofuran, benzoxazole, benzothiazole, carbazole, carboline, cinnoline, furan, imidazole, imidazopyridine, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyridone, pyrimidine, pyrrole, pyrrolizine, quinazoline, quinoline, quinolizine, quinoxaline, tetrazole, thiadiazole, thiazole, thiophene, triazole, and xanthene.

All numerical ranges herein include all numerical values and ranges of all numerical values within the recited range of numerical values. As a non-limiting example, ($C_1$-$C_6$) alkyls also include any one of $C_1$, $C_2$, $C_3$, $C_4$, $C_5$, $C_6$, ($C_1$-$C_2$), ($C_1$-$C_3$), ($C_1$-$C_4$), ($C_1$-$C_5$), ($C_2$-$C_3$), ($C_2$-$C_4$), ($C_2$-$C_5$), ($C_2$-$C_6$), ($C_3$-$C_4$), ($C_3$-$C_5$), ($C_3$-$C_6$), ($C_4$-$C_5$), ($C_4$-$C_6$), and ($C_5$-$C_6$)alkyls.

The terms "halo", "halide" and "halogen" as used herein refer to an atom selected from fluorine, chlorine, bromine, and iodine.

The term "engineering plastics" as used herein refers to a group of plastic materials that have better mechanical and/or thermal properties than the more widely used commodity plastics. In some embodiments, "engineering plastics" refers to thermoplastic materials rather than thermosetting ones. Examples of engineering plastics include, but are not limited to, acrylonitrile-butadiene styrene (ABS), polycarbonates and polyamides (nylons).

The term "thermoplastic" as used herein refers to polymers that become plastic or pliable on heating and harden or solidify on cooling, and are able to repeat this process. In some aspects, thermoplastic materials can have a high molecular weight with polymer chains associating by intermolecular forces that can weaken with increased temperature. In one aspect, thermoplastics can be shaped or reshaped and molded. Meanwhile, the term "thermosetting" refers to polymers that form irreversible chemical bonds during curing. In one aspect, thermosetting polymers that have been cured will decompose rather than melt during heating, and do not reform when cooled. In one aspect, the polymeric compositions described herein are not thermosetting and do not contain thermosetting polymers. In a further aspect, some categories of polymers such as, for example, polyurethanes, may contain both thermosetting and thermoplastic members.

The term "thermoplastic elastomer" as used herein refers to polymers that are both thermoplastic and elastomeric. Examples of thermoplastic elastomers, include but are not limited to, a polystyrene-based elastomer (soft segment: polybutadiene, polyisoprene/hard segment: polystyrene), a polyolefin-based elastomer (soft segment: ethylene propylene rubber/hard segment: polypropylene), a polyvinyl chloride-based elastomer (soft segment: polyvinyl chloride/hard segment: polyvinyl chloride), a polyurethane-based elastomer (soft segment: polyether, polyester, or polycarbonate/hard segment: polyurethane), a polyester-based elastomer (soft segment: aliphatic polyester/hard segment: aromatic polyester), a polyether ester-based elastomer (soft segment: polyether/hard segment: polyester), a polyamide-based elastomer (soft segment: polypropylene glycol, polytetramethylene ether glycol, polyester, or polyether/hard segment: polyamide (such as a nylon resin)), a polybutadiene-based elastomer (soft segment: amorphous butyl rubber/hard segment: syndiotactic 1,2-polybutadiene resin), an acrylic elastomer (soft segment: polyacrylate ester/hard segment: polymethyl methacrylate). It is to be noted that the thermoplastic elastomers described herein may be used solely or may be used in combination of two or more thereof. In one aspect, the hard and soft segments of the acrylic elastomer can be selected from syndiotactic poly(methyl methacrylate), poly(n-butyl acrylate), poly(n-propyl acrylate), poly(isobornyl methacrylate), poly(2-ethylhexyl acrylate), poly(isoctyl acrylate), or any combination thereof. In one aspect, the acrylic elastomer is not polymethyl methacrylate.

The term "high temperature polymer" or "high temperature plastic" refers to polymers or plastics that exhibit the property of stability at high temperatures. In one aspect, high temperature polymers and high temperature plastics can be materials able to exceed 120° C. in continuous operating temperature, or can exceed 130, 140, 150, 160, 170, 180, 190, 200, 210, 220, 230, 240, 250, 260, 270, 280, 290, or 300° C. in continuous operating temperature, or a combination of the foregoing values, or a range encompassing any of the foregoing values.

The term "recycled" as used herein refers to a polymeric material or plastic that has been reprocessed into a new product. A recycled polymer or plastic can be waste material from an initial processing step, or can be post-consumer or post-industrial use material. In one aspect, the polymers and polymeric compositions useful herein can be recycled. In another aspect, "mechanical recycling" of plastics and/or polymers occurs when the plastics and/or polymers are remelted and reformed. In some aspects, mechanical recycling can further include regrinding the plastic either before or after remelting. In some aspects, mechanical recycling can cause polymer degradation, which may result in reduced performance during processing such as, for example, undesirable changes to melt flow rate, when compared to virgin polymers. In another aspect, thermoplastic materials exposed to thermal and/or mechanical stresses can become weak and brittle and/or otherwise subject to degradation. In one aspect, the polymers, polymeric compositions, and thermoplastic materials useful herein can be recycled materials or blends of recycled and virgin materials. In another aspect, the methods disclosed herein can be used to improve or increase the melt flow rate for recycled polymers and plastics, and for blends of recycled and virgin polymers.

As used herein, the term "melt flow rate" or "melt flow index" refers to a measure of the ease of flow of a thermoplastic polymer melt, which includes a polymer composition melt. It is defined as the mass of polymer, in grams, flowing in ten minutes through a capillary of a specific diameter and length by a pressure applied via prescribed alternative gravimetric weights at alternative prescribed temperatures. The method is described in the standard ASTM D1238-04.

The present disclosure provides compositions and methods for improving polymer flow rate. Adding an ionic liquid to a polymer may improve the polymer's melt flow index.

In one aspect, the present disclosure provides a polymeric composition including a thermoplastic polymer and an ionic liquid. In one embodiment, the present disclosure provides a polymeric composition including between about 70 wt % and about 99.99 wt % of a thermoplastic polymer, optionally between about 91 wt % and about 99 wt %, or about 70, 75, 80, 85, 90, 91, 92, 93, 94, 95, 96, 97, 98, 99, 99.95, or about 99.99 wt %, or a combination of any of the foregoing values, or a range encompassing any of the foregoing values; and between about 0.01 wt % and about 30 wt %, optionally between about 1 wt % and about 10 wt %, or about 0.01, 0.05, 1, 2, 3, 4, 5, 6, 7, 8, 9, 10, 15, 20, 25, or about 30 wt %, or a combination of any of the foregoing values, or a range encompassing any of the foregoing values, of a compound having the formula (I):

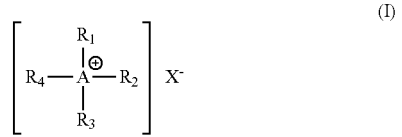

(I)

wherein A is P or N;
$X^-$ is selected from the group consisting of halide, $[B(R)_4]^-$, $OH^-$, $SCN^-$, $RPO_4^-$, $(RO)_2P(=O)O^-$, $RSO_3^-$, $RSO_4^-$, $ROSO_3^-$, $[N(CN)_2]^-$, $RCOO^-$, $NO_3^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, methoxy, carboxy, $-NH_2$, $-OH$, $-SH$, $-NHCH_3$, $-N(CH_3)_2$, $-SMe$ and cyano;
when A is P,
each of $R_1$, $R_2$, $R_3$ and $R_4$ is independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl $(C_1-C_8)$ alkyl, aryl$(C_1-C_8)$alkyl, heteroaryl and heteroaryl$(C_1-C_8)$alkyl that may be unsubstituted or substituted by halogen, nitro, trifluoromethyl, trifluoromethoxy, methoxy, carboxy, $-NH_2$, $-OH$, $-SH$, $-NHCH_3$, $-N(CH_3)_2$, cyano, $-SMe$, and $-SO_3H$, when A is N,
each of $R_1$, $R_2$, $R_3$ and $R_4$ is independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$ heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, trifluoromethyl, trifluoromethoxy, methoxy, carboxy, $-NH_2$, $-OH$, $-SH$, $-NHCH_3$, $-N(CH_3)_2$, cyano, $-SMe$, and $-SO_3H$, or

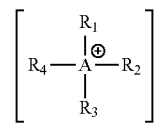

is heterocyclyl or a heteroaryl ring containing nitrogen, wherein the heterocyclyl or the heteroaryl ring is optionally substituted by a substitution selected the group consisting of $(C_1-C_{20})$alkyl, aryl, $(C_3-C_{10})$heterocyclyl, $(C_3-C_{10})$cycloalkyl, $(C_3-C_{10})$ heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, trifluoromethyl, trifluoromethoxy, methoxy, carboxy, $-NH_2$, $-OH$, $-SH$, $-NHCH_3$, $-N(CH_3)_2$, cyano, $-SMe$, and $-SO_3H$.

In one embodiment, the polymeric composition contains a blend of two or more compounds having the formula (I) in any proportion. In one aspect, a first compound having the formula (I) can be present in a ratio of about 10:1 to about 1:10, or of about 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, or about 1:10, or a combination of any of the foregoing values, or a range encompassing any of the foregoing values, relative to a second compound having the formula (I). In another aspect, the polymeric composition contains a single compound having the formula (I) and does not contain a blend.

In one embodiment, when A is P, $X^-$ is selected from the group consisting of halide, $[B(R)_4]^-$, $OH^-$, $SCN^-$, $RPO_4^-$, $(RO)_2P(=O)O^-$, $RSO_4^-$, $ROSO_3^-$, $[N(CN)_2]^-$, $[RCOO]^-$, $[NO_3]^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, methoxy, carboxy, $-NH_2$, $-OH$, $-SH$, $-NHCH_3$, $-N(CH_3)_2$, $-SMe$ and cyano.

In one embodiment, the polymeric composition has a melt flow rate higher than that of the thermoplastic polymer.

In one embodiment, the compound is an ionic liquid.

In one embodiment, thermoplastic polymer is a high temperature polymer selected from the group consisting of polyamides, polyamideimides, polysulfones, polyethersulfones, polyarylsulfones, poly ketones, polyphenylsulfones, polyetherimides, polyetherketones, polyphenylene sulfoxide, and combinations thereof.

In one embodiment, the polyamide can be a natural or a synthetic polyamide. In another embodiment, the polyamide can be an aliphatic polyamide or an aromatic polyamide, or can include both aromatic and aliphatic segments (i.e., can be a polyphthalamide). In still another embodiment, when the polyamide includes an aliphatic segment, the aliphatic segment can have from about 1 to about 10 carbon atoms, or can have 1, 2, 3, 4, 5, 6, 7, 8, 9, or 10 carbon atoms, or a combination of any of the foregoing values, or a range encompassing any of the foregoing values. In one embodiment, the polyamide can be, Nylon 3 (Poly(propiolactam)), Nylon 6 (Poly(caprolactam)), Nylon 8 (Polycapryllactam), Nylon 10 (Poly(decano-10-lactam)), Nylon 11 (Poly(undecano-11-lactam)), Nylon 12 (Poly(dodecano-12-lactam)), Nylon 4,6 (Poly(tetramethylene adipamide)), Nylon 6,6 (Poly(hexamethylene adipamide)), Nylon 6,9 (Poly(hexamethylene azelamide)), Nylon 6,10 (Poly(hexamethylene sebacamide)), Nylon 6,12 (Poly(hexamethylene dodecanediamide)), Nylon 10,10 (Poly(decamethylene sebacamide)), Poly(hexamethylene isophthalamide), Poly(hexamethylene teraphthalamide), Poly(m-phenylene terephthalamide), Poly(nonanmethylene teraphthalamide), para-aramid, or any combination thereof. In an alternative embodiment, the thermoplastic polymer can exclude one or more polyamides listed herein.

In another embodiment, the thermoplastic polymer is a thermoplastic elastomer selected from the group consisting of thermoplastic polyurethanes, thermoplastic copolyester, thermoplastic polyamides, and combinations thereof.

In another embodiment, the thermoplastic polymer is selected from the group consisting of polycarbonates, polyolefins, polyimides, polyphthalamide, polyamides, polymethyl methacrylate, polyamideimides, polysulfones, polyethersulfones, polyurethane, polyarylsulfones, poly ketones, polyphenylsulfones, polyetherimides, polyetherketones, polyphenylene sulfoxide, thermoplastic vulcanizate and combinations thereof.

In another embodiment, the thermoplastic polymer is selected from the group consisting of rubber, fiber, plastic, adhesive polymer, polymer paint, polymer composite, engineering plastics, thermoplastic elastomers, and high temperature plastics.

In another embodiment, the thermoplastic polymer is selected from the group consisting of engineering plastics, thermoplastic elastomers, and high temperature plastics.

In another embodiment, the thermoplastic polymer is thermoplastic polyurethane elastomer.

In any of these embodiments, the thermoplastic polymer can be a blend of two or more thermoplastic polymers. In a further embodiment, the blend can include from about 1% to about 99% of a first polymer and from about 99% to about 1% of a second polymer, or about 1, 5, 10, 15, 20, 25, 30, 35, 40, 45, 50, 55, 60, 65, 70, 75, 80, 85, 90, 95, or about 99% the first polymer and about 99, 95, 90, 85, 80, 75, 70, 65, 60, 55, 50, 45, 40, 35, 30, 25, 20, 15, 10, 5, or about 1% of the second polymer, or a combination of any of the foregoing values, or a range encompassing any of the foregoing values. In one embodiment, the thermoplastic polymer is not a blend of a polyester and a polycarbonate.

In an alternative embodiment, the thermoplastic polymer is a single polymer and is not a blend of two or more different thermoplastic polymers.

In still another embodiment, the thermoplastic polymer can be a blend of at least one recycled polymer and at least one virgin polymer. In another embodiment, the at least one recycled polymer and the at least one virgin polymer can be the same or different polymers. In yet another embodiment, when the thermoplastic polymer is a blend of at least one recycled polymer and at least one virgin polymer, the blend can include from about 1% to about 99% recycled polymer and from about 99% to about 1% virgin polymer, or about 1, 5, 10, 15, 20, 25, 30, 35, 40, 45, 50, 55, 60, 65, 70, 75, 80, 85, 90, 95, or about 99% recycled polymer and about 99, 95, 90, 85, 80, 75, 70, 65, 60, 55, 50, 45, 40, 35, 30, 25, 20, 15, 10, 5, or about 1% virgin polymer, or a combination of any of the foregoing values, or a range encompassing any of the foregoing values. In still another aspect, the at least one recycled polymer, the at least one virgin polymer, or both, can be a blend of two or more different thermoplastic polymers as described above. In still another aspect, the thermoplastic polymer is not a blend of recycled and virgin polymers and instead includes 100% of either one or more recycled polymers or one or more virgin polymers.

In another embodiment, the polymeric composition further includes at least one selected from the group consisting of glass fibers, carbon fibers, and clays.

In another embodiment, the polymeric composition includes the compound in the amount of between about 0.05 wt % and about 10 wt %. In one embodiment, the polymeric composition includes the compound in the amount of about 0.05 wt %, 0.1 wt %, 0.2 wt %, 0.5 wt %, 1.0 wt %, 1.5 wt %, 2.0 wt %, 5.0 wt %, 10 wt %, 15 wt %, 20 wt %, 25 wt %, or 30 wt %.

In another embodiment, the polymeric composition has a melt flow rate at least 20%, 30%, 40%, 50%, 60%, 70%, 80%, 90%, 100%, 110%, 120%, 130%, 140%, 150%, 160%, 170%, 180%, 190%, or 200% higher than the thermoplastic polymer.

In another embodiment, the compound is selected from the group consisting of

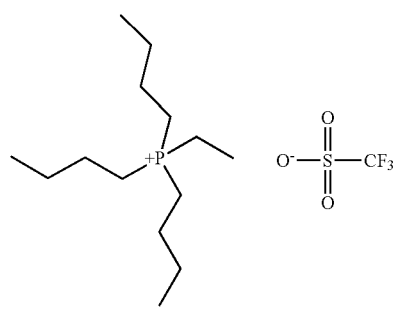

(A-1)

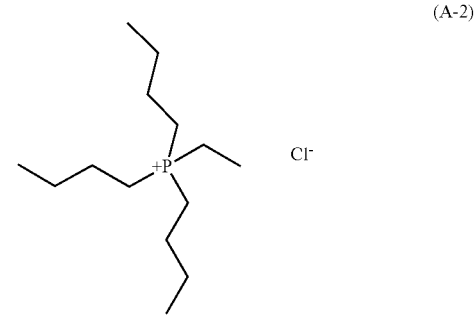

(A-2)

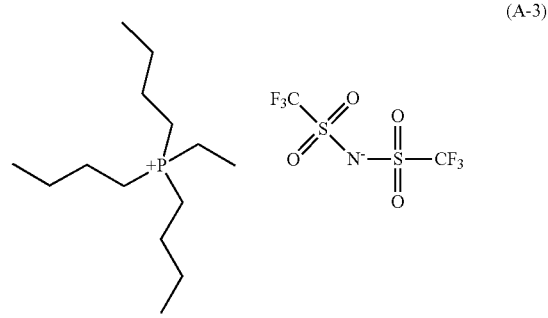

(A-3)

(A-4) 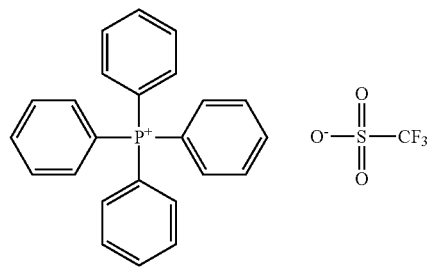

(A-5)

(A-6)

(A-7) 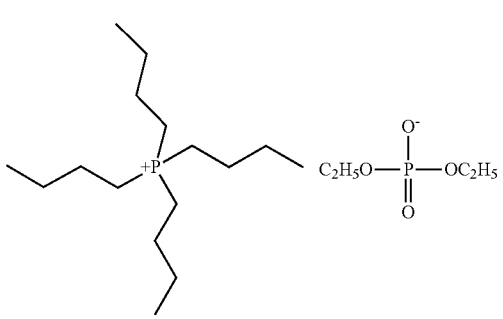

(A-8)

(A-9) 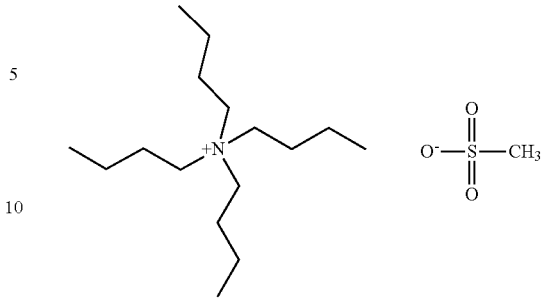

(A-10) 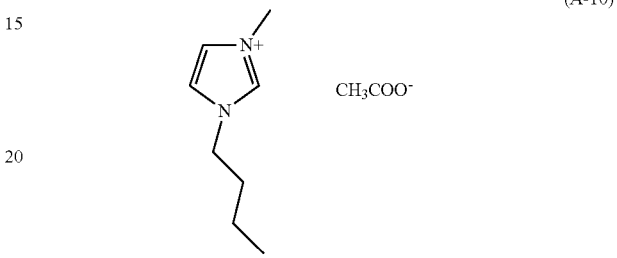

(A-11) 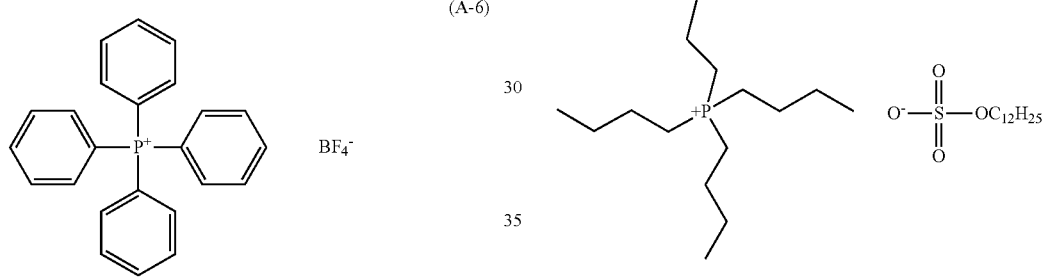

In another aspect, the present disclosure provides a method of preparing a polymeric composition with improved melt flow rate including the step of mixing between about 70 wt % and about 99.99 wt % of a thermoplastic polymer, optionally between about 91 wt % and about 99 wt %, or about 70, 75, 80, 85, 90, 91, 92, 93, 94, 95, 96, 97, 98, 99, 99.95, or about 99.99 wt %, or a combination of any of the foregoing values, or a range encompassing any of the foregoing values, with between about 0.01 wt % and about 30 wt %, optionally between about 1 wt % and about 10 wt %, or about 0.01, 0.05, 1, 2, 3, 4, 5, 6, 7, 8, 9, 10, 15, 20, 25, or about 30 wt %, or a combination of any of the foregoing values, or a range encompassing any of the foregoing values, of a compound having the formula (I)

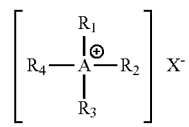

(I)

wherein A is P or N;

X⁻ is selected from the group consisting of halide, [B(R)₄]⁻, OH⁻, SCN⁻, RPO₄⁻, (RO)₂P(=O)O⁻, RSO₃⁻, RSO₄⁻, ROSO₃⁻, [N(CN)₂]⁻, RCOO⁻, NO₃⁻, [PF₆]⁻, [BF₄]⁻, (RSO₂)₂N⁻, oxalate, dicarboxylate and tricarboxylate, formate, phosphate, and aluminate, wherein each R is independently selected from the group consisting of $(C_1$-$C_{20})$alkyl, aryl, $(C_3$-$C_{10})$heterocyclyl, $(C_3$-$C_{10})$cycloalkyl, $(C_3$-$C_{10})$heterocyclyl$(C_1$-$C_8)$alkyl, aryl$(C_1$-$C_8)$alkyl, heteroaryl and heteroaryl$(C_1$-$C_8)$alkyl group that may be unsubstituted or substituted by halogen, nitro, methoxy, carboxy, —$NH_2$, —OH, —SH, —$NHCH_3$, —$N(CH_3)_2$, —SMe and cyano; when A is P, each of $R_1$, $R_2$, $R_3$ and $R_4$ is independently selected from the group consisting of $(C_1$-$C_{20})$alkyl, aryl, $(C_3$-$C_{10})$heterocyclyl, $(C_3$-$C_{10})$cycloalkyl, $(C_3$-$C_{10})$heterocyclyl $(C_1$-$C_8)$ alkyl, aryl$(C_1$-$C_8)$alkyl, heteroaryl and heteroaryl$(C_1$-$C_8)$alkyl that may be unsubstituted or substituted by halogen, nitro, trifluoromethyl, trifluoromethoxy, methoxy, carboxy, —$NH_2$, —OH, —SH, —$NHCH_3$, —$N(CH_3)_2$, cyano, —SMe, and —$SO_3H$;

when A is N, each of $R_1$, $R_2$, $R_3$ and $R_4$ is independently selected from the group consisting of hydrogen, $(C_1$-$C_{20})$alkyl, aryl, $(C_3$-$C_{10})$heterocyclyl, $(C_3$-$C_{10})$cycloalkyl, $(C_3$-$C_{10})$heterocyclyl$(C_1$-$C_8)$alkyl, aryl$(C_1$-$C_8)$alkyl, heteroaryl and heteroaryl$(C_1$-$C_8)$alkyl group that may be unsubstituted or substituted by halogen, nitro, trifluoromethyl, trifluoromethoxy, methoxy, carboxy, —$NH_2$, —OH, —SH, —$NHCH_3$, —$N(CH_3)_2$, cyano, —SMe, and —$SO_3H$, or

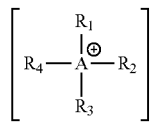

is a heterocyclyl or a heteroaryl ring containing nitrogen, wherein the heterocyclyl or the heteroaryl ring is optionally substituted by a substitution selected the group consisting of $(C_1$-$C_{20})$alkyl, aryl, $(C_3$-$C_{10})$heterocyclyl, $(C_3$-$C_{10})$cycloalkyl, $(C_3$-$C_{10})$heterocyclyl$(C_1$-$C_8)$alkyl, aryl$(C_1$-$C_8)$alkyl, heteroaryl and heteroaryl$(C_1$-$C_8)$alkyl group that may be unsubstituted or substituted by halogen, nitro, trifluoromethyl, trifluoromethoxy, methoxy, carboxy, —$NH_2$, —OH, —SH, —$NHCH_3$, —$N(CH_3)_2$, cyano, —SMe, and —$SO_3H$; wherein the polymeric composition has a melt flow rate higher than that of the thermoplastic polymer.

In one embodiment, when A is P, $X^-$ is selected from the group consisting of halide, $[B(R)_4]^-$, $OH^-$, $SCN^-$, $RPO_4^-$, $(RO)_2P(=O)O^-$, $RSO_4^-$, $ROSO_3^-$, $[N(CN)_2]^-$, $[RCOO]^-$, $[NO_3]^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of $(C_1$-$C_{20})$alkyl, aryl, $(C_3$-$C_{10})$heterocyclyl, $(C_3$-$C_{10})$cycloalkyl, $(C_3$-$C_{10})$heterocyclyl$(C_1$-$C_8)$alkyl, aryl$(C_1$-$C_8)$alkyl, heteroaryl and heteroaryl$(C_1$-$C_8)$alkyl group that may be unsubstituted or substituted by halogen, nitro, methoxy, carboxy, —$NH_2$, —OH, —SH, —$NHCH_3$, —$N(CH_3)_2$, —SMe and cyano.

In one embodiment, the compound having formula (I) can be added during the step of manufacturing the thermoplastic polymer. In a further embodiment, when the thermoplastic polymer is a blend of two or more polymers, the compound having formula (I) can be added to one polymer or more than one polymer. In embodiments when the thermoplastic polymer incorporates a portion of recycled material and a portion of virgin polymer, the compound having formula (I) can be added to the virgin polymer during manufacturing of the virgin polymer.

In some aspects, a change in molecular weight of thermoplastic polymers has been used to modify flowing behavior. However, further in this aspect, changing molecular weight of the thermoplastic polymers can lead to undesirable changes in other physical properties of the polymers and articles made therefrom. Thus, in one aspect, it is desirable to maintain molecular weight of the polymers but to improve the melt flow rate. In one aspect, when the compound having formula (I) are added during polymerization of monomers to form the thermoplastic polymer, the compound having formula (I) do not interfere with the polymerization reaction and/or do not cause a change in target molecular weight of the thermoplastic polymers being synthesized. In another aspect, the compound having formula (I) can be added during manufacturing (i.e., polymerization) of the thermoplastic polymers at any dosage level disclosed herein without interfering in the polymerization reaction. In still another aspect, the compound having formula (I) is retained with the polymers during any subsequent processing steps. In one aspect, including the compound having formula (I) during the manufacturing step eliminates additional mixing or processing steps later on, since the compound having formula (I) is already evenly dispersed in the thermoplastic polymer. Further in this aspect, due to the even dispersal of the compound having formula (I) in the thermoplastic polymer, the polymeric composition can benefit from increases in melt flow rate at every stage of polymer processing, including the earliest stages including, but not limited to, extrusion of the polymeric composition. In another aspect, elimination of mixing steps by incorporating the compound having formula (I) during manufacturing of the thermoplastic polymer can be advantageous in that it reduces manufacturing costs.

In another embodiment, the compound having formula (I) can be added after the thermoplastic polymer has already been manufactured. Further in this aspect, mixing may be required to ensure even dispersal of the compound having formula (I) throughout the polymeric composition.

In still another embodiment, when the polymeric composition includes a mix of virgin and recycled polymers, the compound having formula (I) can be added to the recycled polymer after or during any recycling processes, and the same or a different compound having formula (I) can be added to the virgin polymer during the step of manufacturing. In an alternative embodiment, when the polymeric composition includes a mix of virgin and recycled polymers, the compound having formula (I) can be added to the recycled polymer after any recycling processes, or the compound having formula (I) can be added to the virgin polymer during the step of manufacturing. In this embodiment, when the virgin and recycled polymers are mixed, it is expected that the compound having formula (I) will distribute itself throughout the polymeric composition as mixing of the virgin polymer and recycled polymer is conducted.

In one embodiment, the thermoplastic polymer is selected from the group consisting of polycarbonates, polyolefins, polyimides, polyphthalamide, polyamides, polymethyl methacrylate, polyamideimides, polysulfones, polyethersulfones, polyurethane, polyarylsulfones, poly ketones, polyphenylsulfones, polyetherimides, polyetherketones, polyphenylene sulfoxide, thermoplastic vulcanizate and combinations thereof.

In another embodiment, the thermoplastic polymer is selected from the group consisting of rubber, fiber, plastic, adhesive polymer, polymer paint, polymer composite, engineering plastics, thermoplastic elastomers, and high temperature plastics.

In another embodiment, the thermoplastic polymer is selected from the group consisting of engineering plastics, thermoplastic elastomers, and high temperature plastics.

In another embodiment, the thermoplastic polymer is a high temperature polymer selected from the group consisting of polyamides, polyamideimides, polysulfones, polyethersulfones, polyarylsulfones, poly ketones, polyphenylsulfones, polyetherimides, polyetherketones, polyphenylene sulfoxide, and combinations thereof.

In another embodiment, the thermoplastic polymer is a thermoplastic elastomer selected from the group consisting of thermoplastic polyurethanes, thermoplastic copolyester, thermoplastic polyamides, and combinations thereof. In one embodiment, when the thermoplastic polymer is a thermoplastic polyamide, the compound having formula (I) is not an alkylphosphonium tetrafluoroborate such as, for example, tri-n-butyl-n-hexadecylphosphonium tetrafluoroborate.

In another embodiment, the thermoplastic polymer is thermoplastic polyurethane elastomer.

In one embodiment, the thermoplastic polymer is a recycled thermoplastic polymer. In a further aspect, the recycled thermoplastic polymer can be a reground or remelted thermoplastic polymer, or a combination thereof. Without wishing to be bound by theory, in one aspect, cleaning or removing contaminants or degradation products from recycled polymers may improve the melt flow rate of the recycled polymers, but performing this step may not be economically and/or chemically practical. In a further aspect, the methods and compositions disclosed herein allow for the use of recycled polymers in equipment designed for virgin polymers without the need for a purification step. In one aspect, the recycled polymers are not cleaned or purified prior to being used in the disclosed methods. In another aspect, the disclosed methods allow for the direct use of recycled polymers without the need for a cleaning or purification step.

In another embodiment, each of $R_1$, $R_2$, $R_3$ or $R_4$ is independently selected from the group consisting of ($C_1$-$C_{20}$)alkyl, aryl, and aryl($C_1$-$C_8$)alkyl; $X^-$ is selected from the group consisting of $(CN)_2N^-$, $RCOO^-$, halide, $OH^-$, $SH^-$, $CN^-$, $[PF_6]^-$, $[BF_4]^-$, $ROSO_3^-$, $(RO)_2P(=O)O^-$, and $(RSO_2)_2N^-$, wherein R is selected from the group consisting of ($C_1$-$C_{20}$)alkyl, aryl, and aryl($C_1$-$C_8$)alkyl optionally substituted by halogen.

In another embodiment, A is P; each of $R_1$, $R_2$, $R_3$ or $R_4$ is independently selected from the group consisting of ($C_1$-$C_{20}$)alkyl, aryl, and aryl($C_1$-$C_8$)alkyl; $X^-$ is selected from the group consisting of $(CN)_2N^-$, $RCOO^-$, halide, $OH^-$, $SH^-$, $CN^-$, $[PF_6]^-$, $[BF_4]^-$, $ROSO_3^-$, $(RO)_2P(=O)O^-$, and $(RSO_2)_2N^-$, wherein R is selected from the group consisting of ($C_1$-$C_{20}$)alkyl, aryl, and aryl($C_1$-$C_8$)alkyl optionally substituted by halogen.

In another embodiment, A is N; each of $R_1$, $R_2$, $R_3$ or $R_4$ is independently selected from the group consisting of ($C_1$-$C_7$)alkyl, aryl, and aryl($C_1$-$C_8$)alkyl; or

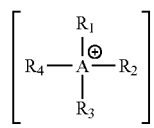

is a heterocyclyl or a heteroaryl ring selected from the group consisting of

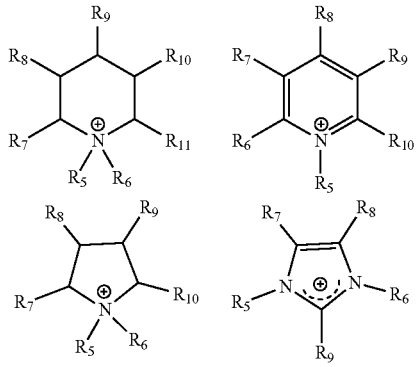

wherein each of $R_5$-$R_{11}$ is independently hydrogen or ($C_1$-$C_{20}$)alkyl;

$X^-$ is selected from the group consisting of $(CN)_2N^-$, $RCOO^-$, halide ion, $OH^-$, $SH^-$, $CN^-$, $[PF_6]^-$, $[BF_4]^-$, $ROSO_3^-$, $RSO_3^-$, $(RO)_2P(=O)O^-$, and $(RSO_2)_2N^-$, wherein R is selected from the group consisting of ($C_1$-$C_{20}$)alkyl, aryl, and aryl($C_1$-$C_8$)alkyl optionally substituted by halogen.

In one embodiment, the method includes mixing the compound in the amount of between about 0.05 wt % and about 10 wt % of polymeric composition. In another embodiment, the compound is mixed in the amount of about 0.05 wt %, 0.1 wt %, 0.2 wt %, 0.5 wt %, 1.0 wt %, 1.5 wt %, 2.0 wt %, 5.0 wt %, 10 wt %, 15 wt %, 20 wt %, 25 wt %, or 30 wt % of the polymeric composition.

In one embodiment, the polymeric composition further comprises one selected from the group consisting of glass fibers, carbon fibers, and clays.

In another embodiment, the polymeric composition has a melt flow rate at least 20%, 30%, 40%, 50%, 60%, 70%, 80%, 90%, 100%, 110%, 120%, 130%, 140%, 150%, 160%, 170%, 180%, 190%, or 200% higher than the thermoplastic polymer.

In one embodiment, the preparation of the polymeric compositions disclosed herein is achieved by merely mixing the ingredients under conditions suitable for the formation of an intimate mixture. Such conditions include, but are not limited to, solution blending or melt mixing in single or twin-screw type extruders, mixing bowl, roll, kneader, or similar mixing device that can apply a shear to the components. In one embodiment, a twin-screw extruder is used.

In one embodiment, the compound is selected from the group consisting of compounds A-1, A-2, A-3, A-4, A-5, A-6, A-7, A-8, A-9, A-10, and A-11.

In another aspect, the present disclosure provides a method of preparing a polymeric composition with improved melt flow rate including the step of mixing between about 70 wt % and about 99.99 wt % of a thermoplastic polymer, optionally between about 91 wt % and about 99 wt %, or about 70, 75, 80, 85, 90, 91, 92, 93, 94, 95, 96, 97, 98, 99, 99.95, or about 99.99 wt %, or a combination of any of the foregoing values, or a range encompassing any of the foregoing values, with between about 0.01 wt % and about 30 wt %, optionally between about 1 wt % and about 10 wt %, or about 0.01, 0.05, 1, 2, 3, 4, 5, 6, 7, 8, 9, 10, 15, 20, 25, or about 30 wt %, or a combination of any of the foregoing values, or a range encompassing any of the foregoing values, of a compound having the formula (I) to obtain a polymeric composition;

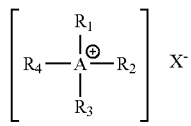 (I)

wherein A is P or N;
when A is P,
  each of $R_1$, $R_2$, $R_3$ and $R_4$ is independently selected from the group consisting of $(C_1-C_{20})$alkyl, aryl, and aryl $(C_1-C_8)$alkyl that may be unsubstituted or substituted by halogen,
  $X^-$ is selected from the group consisting of halide, $[B(R)_4]^-$, $OH^-$, $SCN^-$, $RPO_4^-$, $(RO)_2P(=O)O^-$, $RSO_4^-$, $ROSO_3^-$, $[N(CN)_2]^-$, $[RCO_2]^-$, $[NO_3]^-$, $R_2PO_4^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of $(C_1-C_{20})$alkyl, aryl, and aryl$(C_1-C_8)$alkyl that may be unsubstituted or substituted by halogen;
when A is N,
  each of $R_1$, $R_2$, $R_3$ and $R_4$ is independently selected from the group consisting of hydrogen, $(C_1-C_{20})$alkyl, aryl, and aryl$(C_1-C_8)$alkyl that may be unsubstituted or substituted by halogen, or

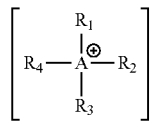

is a heterocyclyl or a heteroaryl ring selected from the group consisting of pyridinium, imidazolium, pyrrolidinium, and piperidinium, wherein the heterocyclyl or the heteroaryl ring is optionally substituted by a substitution selected the group consisting of $(C_1-C_{20})$alkyl, aryl, $(C_3-C_{10})$cycloalkyl, and aryl$(C_1-C_8)$alkyl that may be unsubstituted or substituted by halogen,
  $X^-$ is selected from the group consisting of halide, $[B(R)_4]^-$, $OH^-$, $SCN^-$, $RPO_4^-$, $(RO)_2P(=O)O^-$, $RSO_3^-$, $RSO_4^-$, $ROSO_3^-$, $[N(CN)_2]^-$, $RCOO^-$, $NO_3^-$, $R_2PO_4^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of $(C_1-C_{20})$alkyl, aryl, aryl $(C_1-C_8)$alkyl that may be unsubstituted or substituted by halogen;
  wherein the polymeric composition has a melt flow rate higher than that of the thermoplastic polymer.

In any of these embodiments, the polymeric composition can entirely exclude additional substances not disclosed, or can include less than about 10%, or less than about 9, 8, 7, 6, 5, 4, 3, 2, 1, 0.5, or 0.25% of additional substances not herein disclosed. In one aspect, the polymeric composition is free of, or substantially free of, any fluorochemical repellents or fluorochemical repellency-imparting additives. In one embodiment fluorochemical repellency-imparting additives or repellents that may be excluded from the disclosed polymeric compositions include, but are not limited to those that comprise at least one fluorochemical group, such as, for example, at least one fluoroaliphatic or fluoroalicyclic group. In another embodiment, the excluded polymeric and oligomeric fluorochemicals typically comprise one or more fluorochemical groups that contain a perfluorinated carbon chain having from 3 to about 20 carbon atoms, more preferably from about 4 to about 12 carbon atoms.

In another aspect, the polymeric composition is free of, or substantially free of, impact modifiers including, but not limited to, commercial core-shell impact modifiers, linear or crosslinked copolymers or terpolymers, and the like.

EXAMPLE

The disclosure will now be illustrated with working examples, and which is intended to illustrate the working of disclosure and not intended to restrictively any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

Methods

The melt flow index (also called "melt flow rate") was measured by American Society for Testing Materials (ASTM) D1238-04.

Example 1

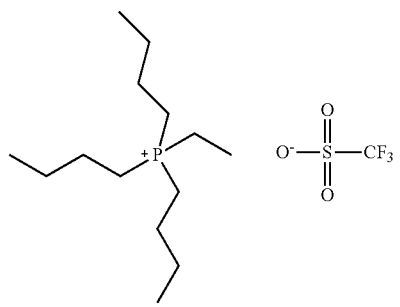

(A-1)

A resin was obtained by mixing 0.5 wt % of compound A-1 with polycarbonate resin using a twin-screw extruder. The resultant resin has a melt flow index increased by 150%. Compound A-1 was also applied in polyamide (Nylon) 6, and Nylon 66. In both cases, the melt flow index increased significantly.

Example 2

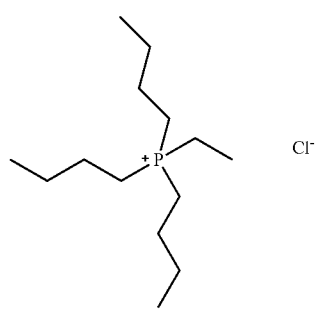

(A-2)

A resin was obtained by mixing 0.3 wt % of compound A-2 with thermoplastic polyurethane (TPU) elastomer using a twin-screw extruder. The resultant modified resin has a melt flow index increased by 60%.

Compound A-2 was applied in other kinds of elastomers, including thermoplastic elastomer (TPE-E, TPE), polyester copolymer elastomer, thermal imide elastomer, thermoplastic elastomer, olefinic (TPO), and thermoplastic vulcanizates (TPV). Similar flow improving effects were obtained.

Example 3

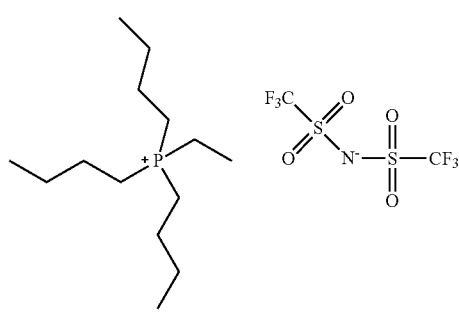

(A-3)

A polymeric composition was obtained by mixing 2 wt % of compound A-3 with polyphthalamide (PPA) using a twin-screw extruder. The torque meter at the extruder showed a reduction: 40%. The melt flow index of the polymeric composition increased by 38% compared to that of original PPA.

Compound A-3 was also applied in other high temperature nylons, including polyamide (PA) 46, PA6T, PA9T, and PA10T. Similar results were obtained.

Example 4

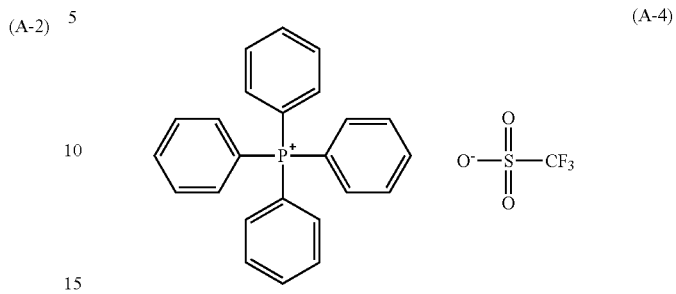

(A-4)

A resin was obtained by mixing 5 wt % of compound A-4 with polysulfone (PSU) using a twin-screw extruder. The resultant resin has a melt flow index increased by 40%.

Compound A-4 was also applied in polyether sulfone (PES), and polyphenylene sulfone (PPSU). Melt flow index increased in every case.

Example 5

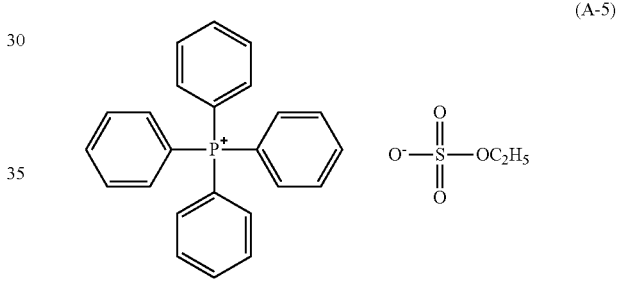

(A-5)

A resin was obtained by mixing 3 wt % of compound A-5 with polyphenylene sulfide (PPS) using a twin-screw extruder. The melt flow index of the resultant resin was 40% higher than that of virgin PPS resin.

Example 6

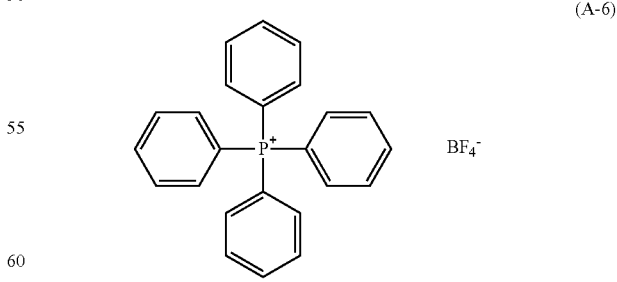

(A-6)

A polymeric composition was obtained by mixing 10 wt % of compound A-6 with polyetheretherketone (PEEK) using a twin-screw extruder. The resultant polymeric composition has a melt index higher than the original PEEK by 36%.

Polyetherketone (PEK) and polyetherketoneketone (PEKK) were also used. The resultant polymeric compositions from both PEK and PEKK have increased melt flow indexes.

Example 7

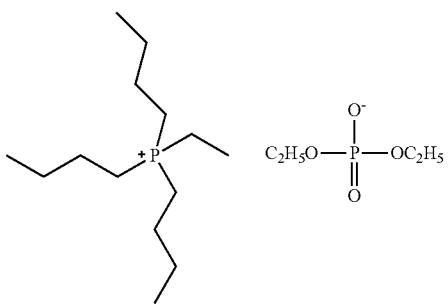
(A-7)

A resin was obtained by mixing 5 wt % of compound A-7 with polybutylene terephthalate (PBT) and 30% glass-fiber using twin-screw extruder. The torque meter on the extruder machine showed a reduction of torque by 30% and the resultant resin has a much smooth surface.

Other polyesters, Polyethylene terephthalate (PET), polytrimethylene terephthalate (PTT), also showed similar effects.

Example 8

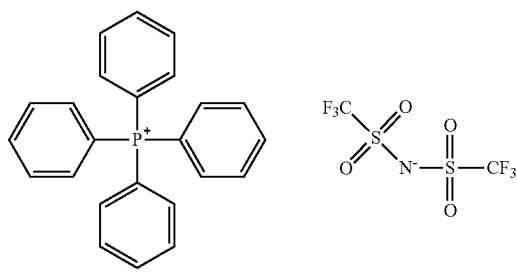
(A-8)

A resin was obtained by mixing 5 wt % of compound A-8 with polyetherimide (PEI) using twin screw extruder. The melt flow index of the resulting resin increased by 35%, compared to original resin. Polyimide (PI) and polyamide-imide (PAI) were also explored, and similar effects were found.

Example 9

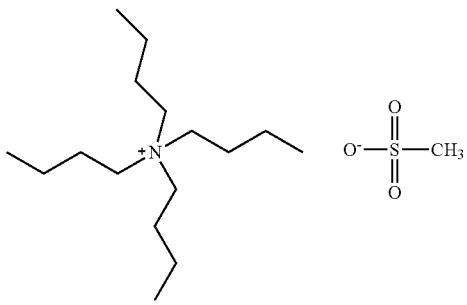
(A-9)

A polymeric composition was obtained by mixing compound A-9 with poly(methyl methacrylate) (PMMA). The resultant polymeric composition is processable at a temperature 20° C. below the temperature for original PMMA.

Similar effects were also observed for cellulose acetate (CA) and cellulose nitrate (CN).

Example 10

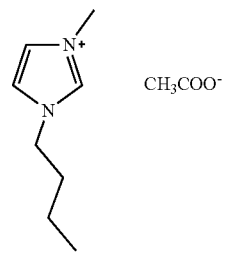
(A-10)

A polymeric composition was obtained by mixing compound A-10 with ethylene-vinyl acetate. The melt flow index of the polymeric composition has increased compared to ethylene-vinyl acetate.

Example 11

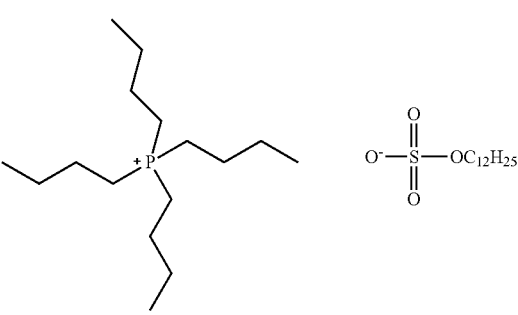
(A-11)

Compound A-11 was applied in polypropylene (PP), polyethylene (PE), polystyrene (PS) and acrylonitrile butadiene styrene (ABS), and their processability was improved.

The present disclosure includes the following embodiments.

Paragraph A-1. A method of preparing a polymeric composition with improved melt flow rate including:

mixing between about 70 wt % and about 99.99 wt % of a thermoplastic polymer, optionally between about 91 wt % and about 99 wt %, or about 70, 75, 80, 85, 90, 91, 92, 93, 94, 95, 96, 97, 98, 99, 99.95, or about 99.99 wt %, or a combination of any of the foregoing values, or a range encompassing any of the foregoing values, with between about 0.01 wt % and about 30 wt %, optionally between about 1 wt % and about 10 wt %, or about 0.01, 0.05, 1, 2, 3, 4, 5, 6, 7, 8, 9, 10, 15, 20, 25, or about 30 wt %, or a combination of any of the foregoing values, or a range encompassing any of the foregoing values, of a compound having the formula (I) to obtain a polymeric composition;

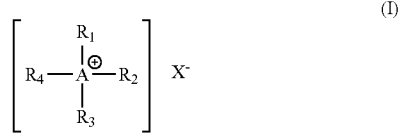

(I)

wherein A is P or N;

$X^-$ is selected from the group consisting of halide, $[B(R)_4]^-$, $OH^-$, $SCN^-$, $RPO_4^-$, $(RO)_2P(=O)O^-$, $RSO_3^-$, $RSO_4^-$, $ROSO_3^-$, $[N(CN)_2]^-$, $RCOO^-$, $NO_3^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, methoxy, carboxy, $-NH_2$, $-OH$, $-SH$, $-NHCH_3$, $-N(CH_3)_2$, $-SMe$ and cyano;

when A is P, each of $R_1$, $R_2$, $R_3$ and $R_4$ is independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl $(C_1-C_8)$ alkyl, aryl$(C_1-C_8)$alkyl, heteroaryl and heteroaryl$(C_1-C_8)$alkyl that may be unsubstituted or substituted by halogen, nitro, trifluoromethyl, trifluoromethoxy, methoxy, carboxy, $-NH_2$, $-OH$, $-SH$, $-NHCH_3$, $-N(CH_3)_2$, cyano, $-SMe$, and $-SO_3H$;

when A is N, each of $R_1$, $R_2$, $R_3$ and $R_4$ is independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, trifluoromethyl, trifluoromethoxy, methoxy, carboxy, $-NH_2$, $-OH$, $-SH$, $-NHCH_3$, $-N(CH_3)_2$, cyano, $-SMe$, and $-SO_3H$, or

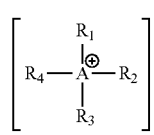

is a heterocyclyl or a heteroaryl ring containing nitrogen, wherein the heterocyclyl or the heteroaryl ring is optionally substituted by a substitution selected the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, trifluoromethyl, trifluoromethoxy, methoxy, carboxy, $-NH_2$, $-OH$, $-SH$, $-NHCH_3$, $-N(CH_3)_2$, cyano, $-SMe$, and $-SO_3H$;

wherein the polymeric composition has a melt flow rate higher than that of the thermoplastic polymer.

Paragraph A-2. The method paragraph A-1, wherein when A is P, $X^-$ is selected from the group consisting of halide, $[B(R)_4]^-$, $OH^-$, $SCN^-$, $RPO_4^-$, $(RO)_2P(=O)O^-$, $RSO_4^-$, $ROSO_3^-$, $[N(CN)_2]^-$, $[RCOO]^-$, $[NO_3]^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, methoxy, carboxy, $-NH_2$, $-OH$, $-SH$, $-NHCH_3$, $-N(CH_3)_2$, $-SMe$ and cyano.

Paragraph A-3. The method of any one of the preceding paragraph, wherein each of $R_1$, $R_2$, $R_3$ or $R_4$ is independently selected from the group consisting of $(C_1-C_{20})$alkyl, aryl, and aryl$(C_1-C_8)$alkyl; $X^-$ is selected from the group consisting of $(CN)_2N^-$, $RCOO^-$, halide, $OH^-$, $SH^-$, $CN$, $[PF_6]^-$, $[BF_4]^-$, $RSO_3^-$, $ROSO_3^-$, $(RO)_2P(=O)O^-$, and $(RSO_2)_2N^-$, wherein R is selected from the group consisting of $(C_1-C_{20})$ alkyl, aryl, and aryl$(C_1-C_8)$alkyl optionally substituted by halogen.

Paragraph A-4. The method of any of the preceding paragraph, wherein A is P;

each of $R_1$, $R_2$, $R_3$ or $R_4$ is independently selected from the group consisting of $(C_1-C_{20})$alkyl, aryl, and aryl $(C_1-C_8)$alkyl;

$X^-$ is selected from the group consisting of $(CN)_2N^-$, $RCOO^-$, halide, $OH^-$, $SH^-$, $CN^-$, $[PF_6]^-$, $[BF_4]^-$, $ROSO_3^-$, $(RO)_2P(=O)O^-$, and $(RSO_2)_2N^-$, wherein R is selected from the group consisting of $(C_1-C_{20})$alkyl, aryl, and aryl$(C_1-C_8)$alkyl optionally substituted by halogen.

Paragraph A-5. The method of any one of the preceding paragraphs, wherein

A is N;

each of $R_1$, $R_2$, $R_3$ or $R_4$ is independently selected from the group consisting of $(C_1-C_7)$alkyl, aryl, and aryl$(C_1-C_8)$alkyl; or

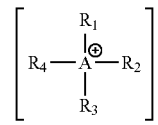

is a heterocyclyl or a heteroaryl ring selected from the group consisting of

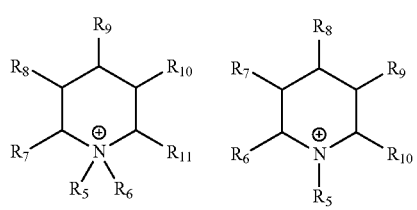

-continued

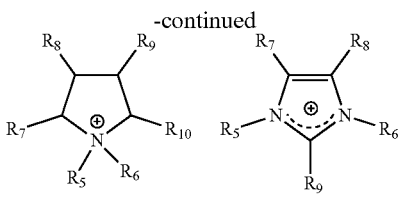

wherein each of $R_5$-$R_{11}$ is independently hydrogen or $(C_1$-$C_{20})$alkyl;

$X^-$ is selected from the group consisting of $(CN)_2N^-$, $RCOO^-$, halide ion, $OH^-$, $SH^-$, $CN^-$, $[PF_6]^-$, $[BF_4]^-$, $ROSO_3^-$, $RSO_3^-$, $(RO)_2P(=O)O^-$, and $(RSO_2)_2N^-$, wherein R is selected from the group consisting of $(C_1$-$C_{20})$alkyl, aryl, and aryl$(C_1$-$C_8)$alkyl optionally substituted by halogen.

Paragraph A-6. A method of preparing a polymeric composition with improved melt flow rate comprising:

mixing between about 70 wt % and about 99.99 wt % of a thermoplastic polymer, optionally between about 91 wt % and about 99 wt %, or about 70, 75, 80, 85, 90, 91, 92, 93, 94, 95, 96, 97, 98, 99, 99.95, or about 99.99 wt %, or a combination of any of the foregoing values, or a range encompassing any of the foregoing values, with between about 0.01 wt % and about 30 wt %, optionally between about 1 wt % and about 10 wt %, or about 0.01, 0.05, 1, 2, 3, 4, 5, 6, 7, 8, 9, 10, 15, 20, 25, or about 30 wt %, or a combination of any of the foregoing values, or a range encompassing any of the foregoing values, of a compound having the formula (I) to obtain a polymeric composition;

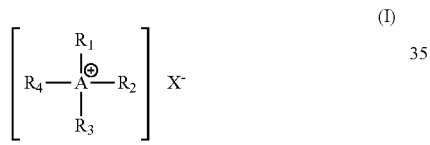 (I)

wherein A is P or N;

when A is P,
each of $R_1$, $R_2$, $R_3$ and $R_4$ is independently selected from the group consisting of $(C_1$-$C_{20})$alkyl, aryl, and aryl $(C_1$-$C_8)$alkyl that may be unsubstituted or substituted by halogen, $X^-$ is selected from the group consisting of halide, $[B(R)_4]^-$, $OH^-$, $SCN^-$, $RPO_4^-$, $(RO)_2P(=O)O^-$, $RSO_4^-$, $ROSO_3^-$, $[N(CN)_2]^-$, $[RCO_2]^-$, $[NO_3]^-$, $R_2PO_4^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of $(C_1$-$C_{20})$alkyl, aryl, and aryl$(C_1$-$C_8)$alkyl that may be unsubstituted or substituted by halogen;

when A is N,
each of $R_1$, $R_2$, $R_3$ and $R_4$ is independently selected from the group consisting of hydrogen, $(C_1$-$C_{20})$alkyl, aryl, and aryl$(C_1$-$C_8)$alkyl that may be unsubstituted or substituted by halogen, or

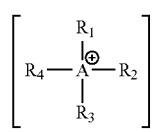

is a heterocyclyl or a heteroaryl ring selected from the group consisting of pyridinium, imidazolium, pyrrolidinium, and piperidinium, wherein the heterocyclyl or the heteroaryl ring is optionally substituted by a substitution selected the group consisting of $(C_1$-$C_{20})$alkyl, aryl, $(C_3$-$C_{10})$cycloalkyl, and aryl$(C_1$-$C_8)$alkyl that may be unsubstituted or substituted by halogen, $X^-$ is selected from the group consisting of halide, $[B(R)_4]^-$, $OH^-$, $SCN^-$, $RPO_4^-$, $(RO)_2P(=O)O^-$, $RSO_3^-$, $RSO_4^-$, $ROSO_3^-$, $[N(CN)_2]^-$, $RCOO^-$, $NO_3^-$, $R_2PO_4^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of $(C_1$-$C_{20})$alkyl, aryl, aryl $(C_1$-$C_8)$alkyl that may be unsubstituted or substituted by halogen;

wherein the polymeric composition has a melt flow rate higher than that of the thermoplastic polymer.

Paragraph A-7. A method of preparing a polymeric composition with improved melt flow rate including:

mixing between about 70 wt % and about 99.99 wt % of a thermoplastic polymer, optionally between about 91 wt % and about 99 wt %, or about 70, 75, 80, 85, 90, 91, 92, 93, 94, 95, 96, 97, 98, 99, 99.95, or about 99.99 wt %, or a combination of any of the foregoing values, or a range encompassing any of the foregoing values, with between about 0.01 wt % and about 30 wt %, optionally between about 1 wt % and about 10 wt %, or about 0.01, 0.05, 1, 2, 3, 4, 5, 6, 7, 8, 9, 10, 15, 20, 25, or about 30 wt %, or a combination of any of the foregoing values, or a range encompassing any of the foregoing values, of a compound selected from the group consisting of

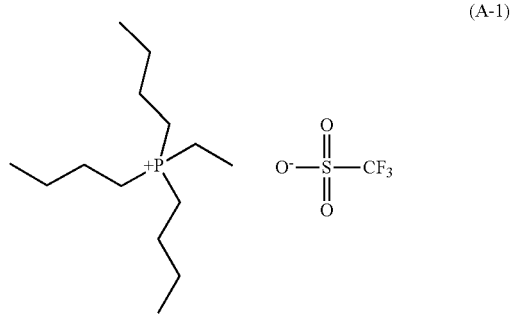 (A-1)

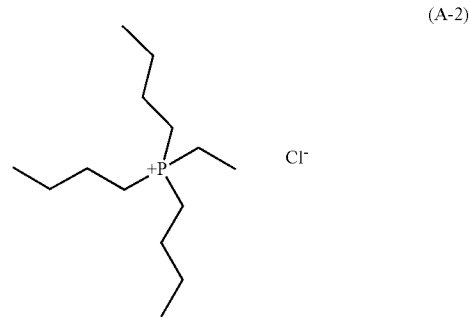 (A-2)

(A-3) 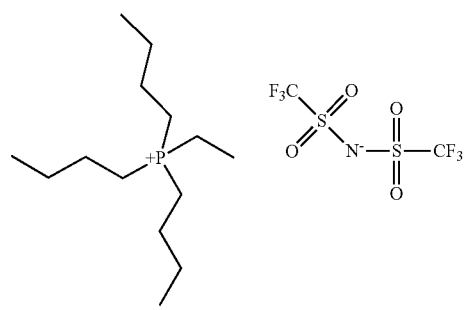

(A-4) 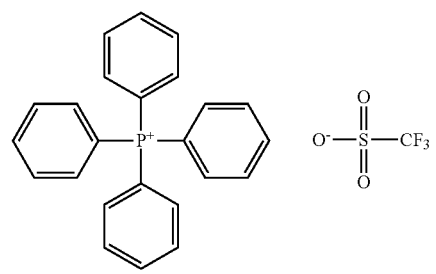

(A-5) 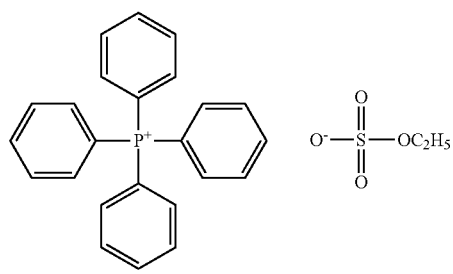

(A-6) 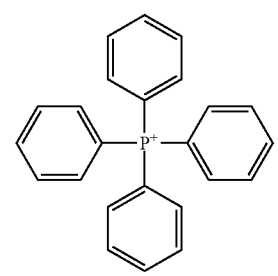

(A-7) 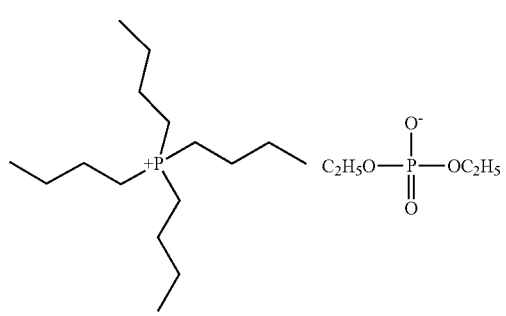

(A-8) 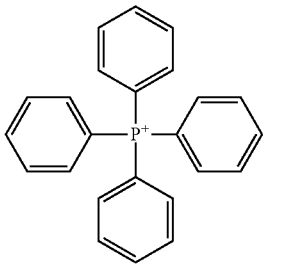

(A-9) 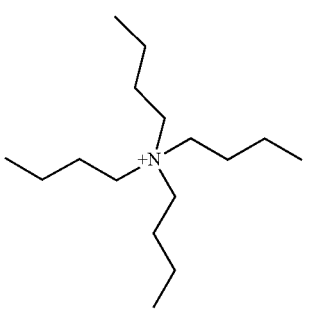

(A-10) 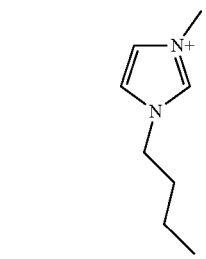

(A-11) 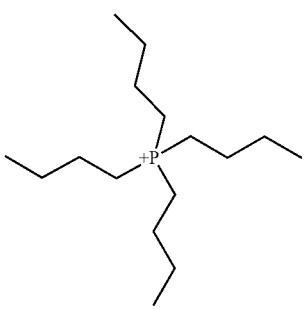

Paragraph A-8. The method of any one of the preceding paragraphs, wherein the thermoplastic polymer is selected from the group consisting of polycarbonates, polyolefins, polyimides, polyphthalamide, polyamides, polymethyl methacrylate, polyamideimides, polysulfones, polyethersulfones, polyurethane, polyarylsulfones, poly ketones, polyphenylsulfones, polyetherimides, polyetherketones, polyphenylene sulfoxide, thermoplastic vulcanizate and combinations thereof; or the thermoplastic polymer is selected from the group consisting of rubber, fiber, plastic, adhesive polymer, polymer paint, polymer composite, engineering plastics, thermoplastic elastomers, and high temperature plastics; or the thermoplastic polymer is selected from the group consisting of engineering plastics, thermoplastic elastomers, and high temperature plastics.

Paragraph A-9. The method of any one of the preceding paragraphs, wherein the thermoplastic polymer is a high temperature polymer selected from the group consisting of polyamides, polyamideimides, polysulfones, polyethersulfones, polyarylsulfones, poly ketones, polyphenylsulfones, polyetherimides, polyetherketones, polyphenylene sulfoxide, and combinations thereof.

Paragraph A-10. The method of any one of the preceding paragraphs, wherein the thermoplastic polymer is a thermoplastic elastomer selected from the group consisting of thermoplastic polyurethanes, thermoplastic copolyester, thermoplastic polyamides, and combinations thereof.

Paragraph A-11. The method of any one of the preceding paragraphs, wherein the thermoplastic polymer is thermoplastic polyurethane elastomer.

Paragraph A-12. The method of any one of the preceding paragraphs, including mixing between about 0.05 wt % and about 10 wt % of the compound.

Paragraph A-13. The method of any one of the preceding paragraphs, wherein the polymeric composition further includes one selected from the group consisting of glass fibers, carbon fibers, and clays.

Paragraph A-14. The method of any one of the preceding paragraphs, wherein the polymeric composition has a melt flow rate at least 20% higher than the thermoplastic polymer, optionally, the polymeric composition has a melt flow rate at least 20, 25, 30, 35, 40, 45, 50, 55, or at least 60% higher than the thermoplastic polymer, or a combination of any of the foregoing values, or a range encompassing any of the foregoing values.

Paragraph A-15. A polymeric composition including,
between about 70 wt % and about 99.99 wt % of a thermoplastic polymer, optionally between about 91 wt % and about 99 wt %, or about 70, 75, 80, 85, 90, 91, 92, 93, 94, 95, 96, 97, 98, 99, 99.95, or about 99.99 wt %, or a combination of any of the foregoing values, or a range encompassing any of the foregoing values; and
between about 0.01 wt % and about 30 wt %, optionally between about 1 wt % and about 10 wt %, or about 0.01, 0.05, 1, 2, 3, 4, 5, 6, 7, 8, 9, 10, 15, 20, 25, or about 30 wt %, or a combination of any of the foregoing values, or a range encompassing any of the foregoing values, of a compound having the formula of

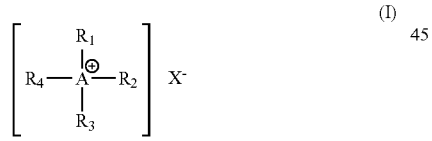

(I)

wherein A is P or N;

$X^-$ is selected from the group consisting of halide, $[B(R)_4]^-$, $OH^-$, $SCN^-$, $RPO_4^-$, $(RO)_2P(=O)O^-$, $RSO_3^-$, $RSO_4^-$, $ROSO_3^-$, $[N(CN)_2]^-$, $RCOO^-$, $NO_3^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, methoxy, carboxy, $-NH_2$, $-OH$, $-SH$, $-NHCH_3$, $-N(CH_3)_2$, $-SMe$ and cyano;

when A is P,
each of $R_1$, $R_2$, $R_3$ and $R_4$ is independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$ alkyl, aryl$(C_1-C_8)$alkyl, heteroaryl and heteroaryl$(C_1-C_8)$alkyl that may be unsubstituted or substituted by halogen, nitro, trifluoromethyl, trifluoromethoxy, methoxy, carboxy, $-NH_2$, $-OH$, $-SH$, $-NHCH_3$, $-N(CH_3)_2$, cyano, $-SMe$, and $-SO_3H$;

when A is N,
each of $R_1$, $R_2$, $R_3$ and $R_4$ is independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, trifluoromethyl, trifluoromethoxy, methoxy, carboxy, $-NH_2$, $-OH$, $-SH$, $-NHCH_3$, $-N(CH_3)_2$, cyano, $-SMe$, and $-SO_3H$, or

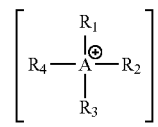

is a heterocyclyl or a heteroaryl ring containing nitrogen, wherein the heterocyclyl or the heteroaryl ring is optionally substituted by a substitution selected the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, trifluoromethyl, trifluoromethoxy, methoxy, carboxy, $-NH_2$, $-OH$, $-SH$, $-NHCH_3$, $-N(CH_3)_2$, cyano, $-SMe$, and $-SO_3H$;

wherein the thermoplastic polymer is a high temperature polymer selected from the group consisting of polyamides, polyamideimides, polysulfones, polyethersulfones, polyarylsulfones, poly ketones, polyphenylsulfones, polyetherimides, polyetherketones, polyphenylene sulfoxide, and combinations thereof; or the thermoplastic polymer is a thermoplastic elastomer selected from the group consisting of thermoplastic polyurethanes, thermoplastic copolyester, thermoplastic polyamides, and combinations thereof;

wherein the polymeric composition has a melt flow rate higher than that of the thermoplastic polymer;

optionally the compound is selected from the group consisting of

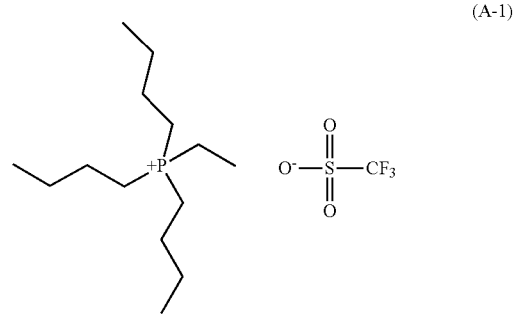

(A-1)

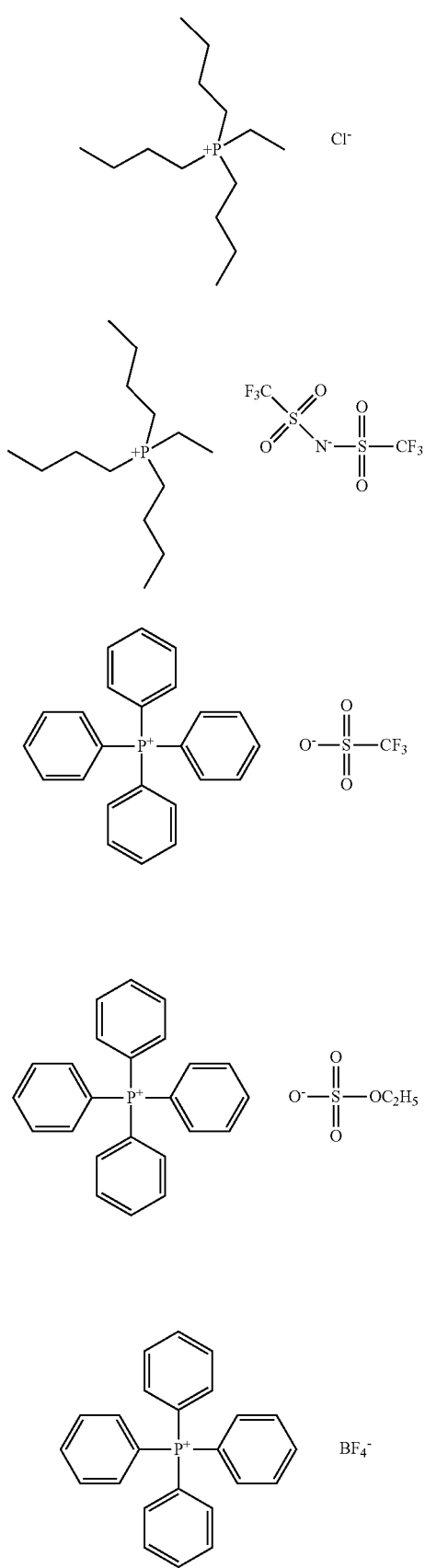
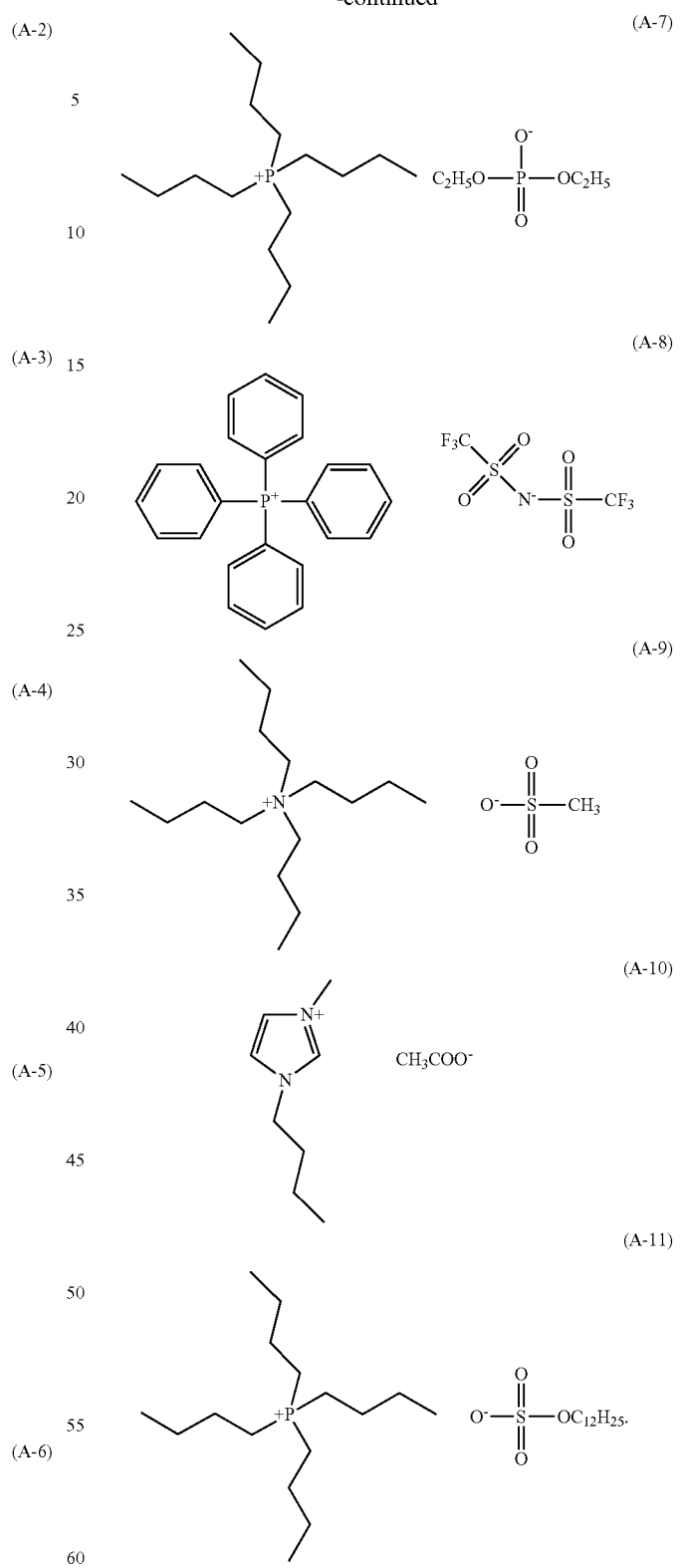
I claim:
1. A method of preparing a polymeric composition with improved melt flow rate comprising:
   mixing between about 70 wt % and about 99.99 wt % of one thermoplastic polymer with between about 0.01 wt % and about 30 wt % of a compound having the formula (I) to obtain a polymeric composition consisting of the one thermoplastic polymer and the compound having formula (I);

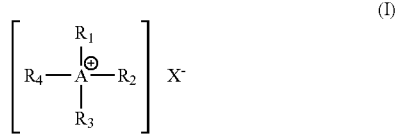

wherein A is P or N;
when A is P,
  each of $R_1$, $R_2$, $R_3$ and $R_4$ is independently selected from the group consisting of aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl that may be unsubstituted or substituted by halogen, nitro, trifluoromethyl, trifluoromethoxy, methoxy, carboxy, —$NH_2$, —OH, —SH, —$NHCH_3$, —$N(CH_3)_2$, cyano, —SMe, and —$SO_3H$;
  $X^-$ is selected from the group consisting of halide, $[B(R)_4]^-$, $OH^-$, $SCN^-$, $RPO_4^-$, $(RO)_2P(=O)O^-$, $RSO_4^-$, $ROSO_3^-$, $[N(CN)_2]^-$, $[RCOO]^-$, $[NO_3]^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, methoxy, carboxy, —$NH_2$, —OH, —SH, —$NHCH_3$, —$N(CH_3)_2$, —SMe and cyano; or
  each of $R_1$, $R_2$, $R_3$ and $R_4$ is independently selected from the group consisting of $(C_1-C_6)$alkyl and $X^-$ is selected from the group consisting of halide, $[B(R)_4]^-$, $OH^-$, $SCN^-$, $RPO_4^-$, $(RO)_2P(=O)O^-$, $RSO_4^-$, $ROSO_3^-$, $[N(CN)_2]^-$, $[RCOO]^-$, $[NO_3]^-$, $[PF_6]^-$, $(RSO_2)_2N^-$, oxalate, dicarboxylate and tricarboxylate, formate, phosphate, and aluminate, wherein each R is independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, methoxy, carboxy, —$NH_2$, —OH, —SH, —$NHCH_3$, —$N(CH_3)_2$, —SMe and cyano;
when A is N,
  each of $R_1$, $R_2$, $R_3$ and $R_4$ is independently selected from the group consisting of hydrogen, $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, trifluoromethyl, trifluoromethoxy, methoxy, carboxy, —$NH_2$, —OH, —SH, —$NHCH_3$, —$N(CH_3)_2$, cyano, —SMe, and —$SO_3H$, or

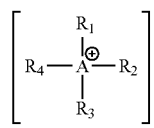

is a heterocyclyl or a heteroaryl ring containing nitrogen, wherein the heterocyclyl or the heteroaryl ring is optionally substituted by a substitution selected the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_8)$alkyl, heteroaryl and heteroaryl$(C_1-C_8)$alkyl group that may be unsubstituted or substituted by halogen, nitro, trifluoromethyl, trifluoromethoxy, methoxy, carboxy, —$NH_2$, —OH, —SH, —$NHCH_3$, —$N(CH_3)_2$, cyano, —SMe, and —$SO_3H$;
  $X^-$ is selected from the group consisting of halide, $[B(R)_4]^-$, $OH^-$, $SCN^-$, $RPO_4^-$, $(RO)_2P(=O)O^-$, $RSO_3^-$, $RSO_4^-$, $ROSO_3^-$, $[N(CN)_2]^-$, $RCOO^-$, $NO_3^-$, $[PF_6]^-$, $[BF_4]^-$, $(RSO_2)_2N^-$, oxalate, dicarboxylate and tricarboxylate, formate, phosphate, and aluminate, wherein each R is independently selected from the group consisting of $(C_1-C_{20})$alkyl, aryl, $(C_3-C_{10})$heterocyclyl, $(C_3-C_{10})$cycloalkyl, $(C_3-C_{10})$heterocyclyl$(C_1-C_8)$alkyl, aryl$(C_1-C_5)$alkyl, heteroaryl and heteroaryl$(C_1-C_8)$alkyl group that may be unsubstituted or substituted by halogen, nitro, methoxy, carboxy, —$NH_2$, —OH, —SH, —$NHCH_3$, —$N(CH_3)_2$, —SMe and cyano;
and, optionally, one selected from the group consisting of glass fibers, carbon fibers, and clays;
wherein the polymeric composition has a melt flow rate higher than that of the thermoplastic polymer, wherein at least 1% of the thermoplastic polymer is a recycled polymer, wherein the recycled polymer and any virgin polymer, if present, are the same polymer, wherein the polymeric composition is free of any fluorochemical repellents or fluorochemical repellency-imparting additives, and wherein the thermoplastic polymer is selected from the group consisting of polycarbonates, polyolefins, polyimides, polyphthalamide, polyamides, polyamideimides, polysulfones, polyethersulfones, polyurethane, polyarylsulfones, poly ketones, polyphenylsulfones, polyetherimides, polyetherketones, polyphenylene sulfoxide, and thermoplastic vulcanizate.

2. The method of claim 1, wherein at least 25% of the thermoplastic polymer is a recycled polymer.

3. The method of claim 1, wherein the thermoplastic polymer is a polymer able to exceed 120° C. in continuous operating temperature.

4. The method of claim 1, wherein the thermoplastic polymer is a thermoplastic elastomer selected from the group consisting of thermoplastic polyurethanes and thermoplastic polyamides.

5. The method of claim 1, wherein
when A is N;
  each of $R_1$, $R_2$, $R_3$ or $R_4$ is independently selected from the group consisting of $(C_1-C_{20})$alkyl, aryl, and aryl$(C_1-C_8)$alkyl;
  $X^-$ is selected from the group consisting of $(CN)_2N^-$, $RCOO^-$, halide, $OH^-$, $SH^-$, $CN^-$, $[PF_6]^-$, $[BF_4]^-$, $ROSO_3^-$, $(RO)_2P(=O)O^-$, and $(RSO_2)_2N^-$, wherein R is selected from the group consisting of $(C_1-C_{20})$alkyl, aryl, and aryl$(C_1-C_8)$alkyl optionally substituted by halogen.

6. The method of claim 1, wherein
A is P;
  wherein each of $R_1$, $R_2$, $R_3$ or $R_4$ is independently selected from the group consisting of aryl, and aryl$(C_1-C_8)$alkyl; and
  $X^-$ is selected from the group consisting of $(CN)_2N^-$, $RCOO^-$, halide, $OH^-$, $SH^-$, $CN^-$, $[PF_6]^-$, $[BF_4]^-$, $ROSO_3^-$, $(RO)_2P(=O)O^-$, and $(RSO_2)_2N^-$, wherein R is selected from the group consisting of $(C_1-C_{20})$alkyl, aryl, and aryl$(C_1-C_8)$alkyl optionally substituted by halogen; or wherein A is P; and wherein each of $R_1$, $R_2$, $R_3$ or $R_4$ is independently selected from the group consisting of $(C_1-C_6)$alkyl and $X^-$ is selected from the group consisting of $(CN)_2N^-$, $RCOO^-$, halide, $OH^-$, $SH^-$, $CN^-$, $[PF_6]^-$, $ROSO_3^-$, $(RO)_2P(=O)O^-$, and $(RSO_2)_2N^-$, wherein R is selected from the group consisting of $(C_1-C_{20})$alkyl, aryl, and aryl$(C_1-C_8)$alkyl optionally substituted by halogen.

7. The method of claim 1, wherein

A is N;

each of $R_1$, $R_2$, $R_3$ or $R_4$ is independently selected from the group consisting of $(C_1-C_7)$alkyl, aryl, and aryl$(C_1-C_8)$alkyl; or

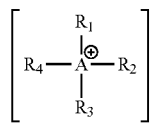

is a heterocyclyl or a heteroaryl ring selected from the group consisting of

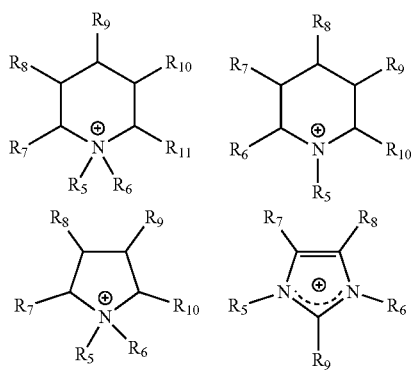

wherein each of $R_5-R_{11}$ is independently hydrogen or $(C_1-C_{20})$alkyl;

$X^-$ is selected from the group consisting of $(CN)_2N^-$, $RCOO^-$, halide ion, $OH^-$, $SH^-$, $CN^-$, $[PF_6]^-$, $[BF_4]^-$, $ROSO_3^-$, $RSO_3^-$, $(RO)_2P(=O)O^-$, and $(RSO_2)_2N^-$, wherein R is selected from the group consisting of $(C_1-C_{20})$alkyl, aryl, and aryl$(C_1-C_8)$alkyl optionally substituted by halogen.

8. The method of claim 1, wherein the thermoplastic polymer is thermoplastic polyurethane elastomer.

9. The method of claim 1 comprising mixing between about 0.05 wt % and about 10 wt % of the compound of formula (I).

10. The method of claim 1, wherein the polymeric composition has a melt flow rate at least 20% higher than the thermoplastic polymer.

11. The method of claim 1, wherein a twin-screw extruder is used in mixing.

12. The method of claim 1, wherein the compound is selected from the group consisting of

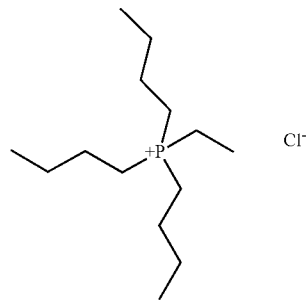
(A-2)

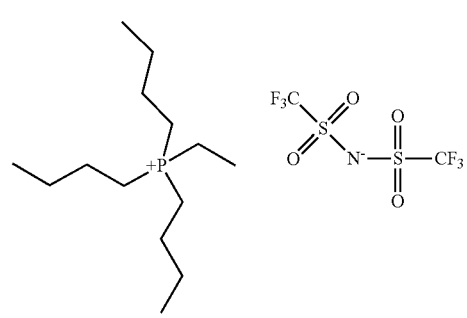
(A-3)

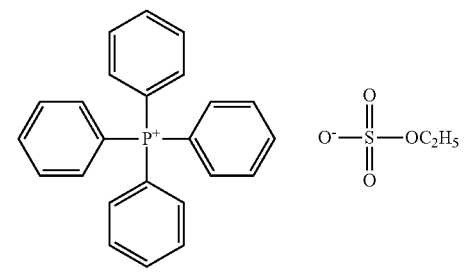
(A-5)

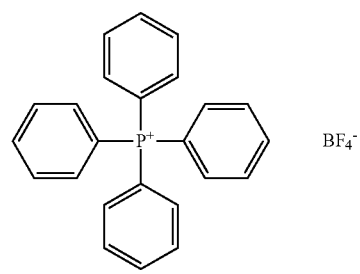
(A-6)

-continued
(A-7)
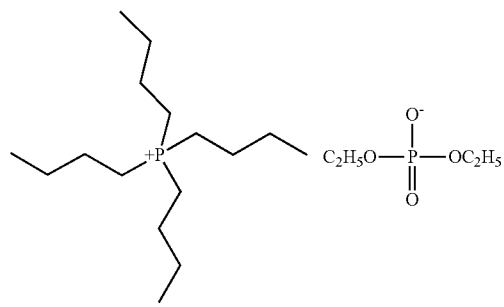
(A-8)
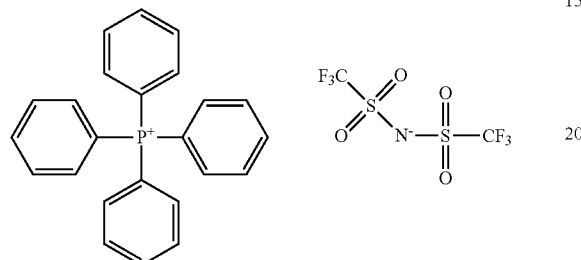
(A-9)
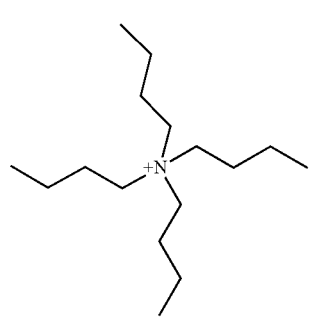
(A-10)
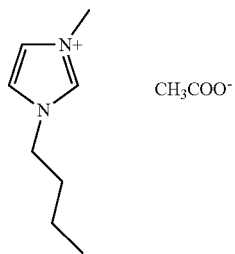
CH₃COO⁻
(A-11)
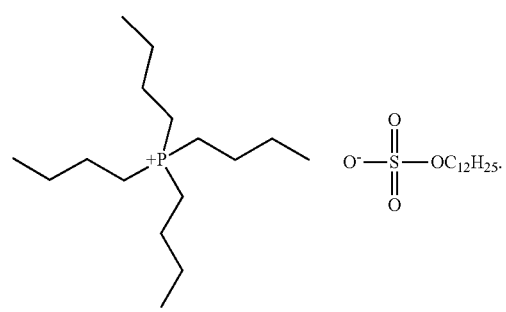
* * * * *